United States Patent
do Amaral Grossi

(10) Patent No.: US 12,497,650 B2
(45) Date of Patent: Dec. 16, 2025

(54) METHODS FOR LOWERING THE INCIDENCE OF HEMORRHAGIC HEART DISEASE IN SWINE

(71) Applicant: Inguran, LLC, Navasota, TX (US)

(72) Inventor: Daniela do Amaral Grossi, Saskatoon (CA)

(73) Assignee: INGURAN, LLC, Navasota, TX (US)

( * ) Notice: Subject to any disclaimer, the term of this patent is extended or adjusted under 35 U.S.C. 154(b) by 859 days.

(21) Appl. No.: 17/690,796

(22) Filed: Mar. 9, 2022

(65) Prior Publication Data
US 2022/0290220 A1   Sep. 15, 2022

Related U.S. Application Data

(60) Provisional application No. 63/159,296, filed on Mar. 10, 2021.

(51) Int. Cl.
| | |
|---|---|
| *C12Q 1/6827* | (2018.01) |
| *A01K 67/02* | (2006.01) |
| *C12Q 1/6858* | (2018.01) |
| *C12Q 1/6883* | (2018.01) |

(52) U.S. Cl.
CPC .......... *C12Q 1/6827* (2013.01); *A01K 67/02* (2013.01); *C12Q 1/6858* (2013.01); *A01K 2227/108* (2013.01); *C12Q 1/6883* (2013.01)

(58) Field of Classification Search
CPC .............. C12Q 1/6858; C12Q 1/6827; C12Q 2600/156; C12Q 1/6883; A01K 67/02; A01K 2227/108
See application file for complete search history.

(56) References Cited

FOREIGN PATENT DOCUMENTS

CN    108676899 A    10/2018

OTHER PUBLICATIONS

Zhitnitskiy P. Mulberry heart disease [Internet]. [cited Mar. 6, 2025]. Available from: https://open.lib.umn.edu/swinedisease/chapter/mulberry-heart-disease (Year: 2024).*
Wang Z, et al. A genome-wide scan for selection signatures in Yorkshire and Landrace pigs based on sequencing data. Anim Genet. Dec. 2014;45(6):808-16. Epub Oct. 19, 2014. (Year: 2014).*
Stowe HD, Miller ER. Genetic predisposition of pigs to hypo- and hyperselenemia. J Anim Sci. Jan. 1985;60(1):200-11. (Year: 1985).*
Weir B.S. "Genetic Data Analysis II 2nd Edition" Sinauer Associates, Inc. Publishers 1996. pp. 112-133.
Oropeza-Moe et al., "A descriptive report of the selenium distribution in tissues from pigs with mulberry heart disease (MHD)," Porcine Health Management, (2019)5:17.
Devlin et al "A Comparison of Linkage Disequilibrium Measures for Fine-Scale Mapping" Genomics 29, 2, p. 311-22 1995.
Miller et al., "A Simple Salting Out Procedure for Extracting DNA from Human Nucleated Cells." Nucleic Acids Research. vol. 16 No. 3. 1988.

(Continued)

*Primary Examiner* — Anne M. Gussow
*Assistant Examiner* — Emma R. Hoppe
(74) *Attorney, Agent, or Firm* — Ryan Christensen; Hashim Rahman

(57) ABSTRACT

The invention encompasses methods for reducing the incidence of hemorrhagic heart disease in livestock.

2 Claims, 14 Drawing Sheets

Specification includes a Sequence Listing.

(56) References Cited

OTHER PUBLICATIONS

Biase et al., "Protocol for Extraction of Genomic DNA from Swine Solid Tissues." Genetics and Molecular Biology, No. 25, vol. 3, pp. 313-315 (2002).

Hoogendorn, et al. "Cheap, accurate and rapid allele frequency estimation of single nucleotide polymorphisms by primer extension and DHPLC in DNA pools." Hum Genet, 107, 2000. p. 488-493.

Moskovina et al., "Streamlined analysis of pooled genotype data in SNP-based association studies." Genet. Epidemiol., 28, 273-282 2005.

Craig, et al., "Identification of disease causing loci using an array-based genotyping approach on pooled DNA" BMC Genomics. 6:138, 2005.

Macgregor et al., "Analysis of pooled DNA samples on high density arrays without prior knowledge of differential hybridization rates." Nucleic Acids Research, 2006, vol. 34, No. 7, 2006.

International Search Report and Written Opinion issued on Jun. 9, 2022 in related PCT Appl. No. PCT/US22/19561.

Bovo et al. "Genome-wide association study for the level of serum electrolytes in Italian Large White pigs" Animal Genetics, Jun. 14, 2016, vol. 47, No. 5, pp. 597-602.

Ma et al. "Genome-wide association analysis reveals genomic regions on Chromosome 13 affecting litter size and candidate genes for uterine horn length in Erhualian pigs" Animal, Dec. 2018, vol. 12, No. 12, pp. 2453-2461.

Chen et al. "Genome-wide association study for backfat thickness at 100 kg and loin muscle thickness in domestic pigs based on genotyping by sequencing" Physiol Genomics, Jul. 1, 2019, vol. 51, No. 7, pp. 261-266.

Shen et al. "Vitamin E and Selenium Levels are Within Normal Range in Pigs Diagnosed with Mulberry Heart Disease and Evidence for Viral Involvement in the Syndrome is Lacking." Transboundary and Emerging Diseases. 58 (2011) 483-491.

Rivero et al. "Simple salting-out method for DNA extraction from formalin-fixed, paraffin-embedded tissues." Pathology—Research and Practice 202 (2006) 523-529.

\* cited by examiner

| Chr | SNP | bp v11.1 | A1 | A2 | Freq | b | se | p | lp | g_FDR | pos | c_FDR |
|---|---|---|---|---|---|---|---|---|---|---|---|---|
| 13 | WU_10.2_13_213405073 | 203413076 | A | B | 0.214544 | 0.007983 | 0.000987 | 0.00000000 | 15.21173 | 0 | 213.4051 | 1% |
| 12 | WU_10.2_12_3372358 | 3332538 | A | B | 0.304628 | 0.005959 | 0.000935 | 0.00000000 | 9.735343 | 0 | 3.372358 | 1% |
| 12 | MARC0034096 | 1814027 | A | B | 0.280713 | 0.006358 | 0.001001 | 0.00000000 | 9.673662 | 0 | 1.716991 | 1% |
| 12 | MARC0027230 | 1809297 | B | A | 0.281661 | 0.006278 | 0.000998 | 0.00000000 | 9.496228 | 0 | 1.712329 | 1% |
| 13 | ALGA0102629 | 203165762 | B | A | 0.059155 | 0.010445 | 0.001697 | 0.00000000 | 9.125249 | 0 | 213.229 | 1% |
| 12 | ASGA0052511 | 2551640 | A | B | 0.334751 | 0.005438 | 0.000953 | 0.00000001 | 7.93319 | 0 | 2.621917 | 1% |
| 13 | WU_10.2_12_3576717 | 3455925 | A | B | 0.423541 | 0.004765 | 0.000866 | 0.00000004 | 7.428132 | 0 | 3.576717 | 1% |
| 12 | WU_10.2_12_3462115 | 3422237 | A | B | 0.422938 | 0.004753 | 0.000867 | 0.00000004 | 7.382588 | 0 | 3.462115 | 1% |
| 12 | MARC0063090 | 1893069 | A | B | 0.353061 | 0.005227 | 0.000955 | 0.00000004 | 7.350431 | 0 | 1.779278 | 1% |
| 12 | WU_10.2_12_3518581 | 3428663 | A | B | 0.431647 | 0.004689 | 0.000859 | 0.00000005 | 7.31202 | 0 | 3.518581 | 1% |
| 12 | ASGA0052467 | 1987101 | A | B | 0.35378 | 0.005175 | 0.000954 | 0.00000006 | 7.240042 | 0 | 1.888177 | 1% |
| 13 | ASGA0060211 | 204883958 | A | B | 0.296551 | -0.00475 | 0.000895 | 0.00000011 | 6.940781 | 0 | 214.9738 | 1% |
| 13 | ASGA0098605 | 203230199 | A | B | 0.22265 | 0.004988 | 0.000952 | 0.00000016 | 6.797882 | 0 | 213.5881 | 1% |
| 12 | WU_10.2_12_3522238 | 3432164 | A | B | 0.44507 | 0.004454 | 0.000858 | 0.00000021 | 6.67778 | 0 | 3.522238 | 1% |
| 12 | WU_10.2_12_815170 | 146373 | A | B | 0.483242 | -0.00501 | 0.000968 | 0.00000022 | 6.648383 | 0 | 0.81517 | 1% |
| 12 | H3GA0055340 | 658326 | B | A | 0.486807 | -0.00509 | 0.000987 | 0.00000025 | 6.598946 | 0 | 0.079502 | 1% |
| 12 | WU_10.2_12_11102 | 699579 | B | A | 0.486979 | -0.00509 | 0.000987 | 0.00000026 | 6.593361 | 0 | 0.011102 | 1% |
| 13 | WU_10.2_13_213415696 | 203402453 | B | A | 0.274734 | 0.004671 | 0.000908 | 0.00000027 | 6.568127 | 0 | 213.4157 | 1% |
| 13 | 13_213436825 | 203381327 | B | A | 0.317419 | 0.004495 | 0.000874 | 0.00000027 | 6.563871 | 0 | 213.4368 | 1% |
| 12 | ASGA0099260 | 489991 | B | A | 0.480052 | -0.00503 | 0.000979 | 0.00000028 | 6.546717 | 0 | 0.248014 | 1% |
| 12 | MARC0089921 | 547357 | B | A | 0.480109 | -0.00503 | 0.000979 | 0.00000029 | 6.54475 | 0 | 0.190362 | 1% |
| 12 | MARC0013397 | 528795 | B | A | 0.480109 | -0.00503 | 0.000979 | 0.00000029 | 6.54475 | 0 | 0.20921 | 1% |
| 12 | WU_10.2_12_145034 | 592677 | A | B | 0.480167 | -0.00503 | 0.000979 | 0.00000029 | 6.544557 | 0 | 0.145034 | 1% |
| 12 | ASGA0052435 | 248447 | A | B | 0.482869 | -0.00497 | 0.00097 | 0.00000030 | 6.528551 | 0 | 0.490194 | 1% |
| 12 | WU_10.2_12_674191 | not mapped | A | B | 0.48695 | 0.004827 | 0.000945 | 0.00000032 | 6.491565 | 0 | 0.674191 | 1% |
| 12 | WU_10.2_12_338561 | 399073 | B | A | 0.476832 | -0.00496 | 0.000977 | 0.00000040 | 6.401404 | 0 | 0.338561 | 1% |

Figure 3A

| | | | | | | | | | | |
|---|---|---|---|---|---|---|---|---|---|---|
| 12 | ASGA0089998 | 824959 | A | B | 0.489997 | -0.00494 | 0.000986 | 0.00000054 | 6.271641 | 0 | 0.940547 | 1% |
| 12 | WU_10.2_12_890035 | 771015 | A | B | 0.489968 | -0.00494 | 0.000986 | 0.00000054 | 6.267404 | 0 | 0.890035 | 1% |
| 12 | WU_10.2_12_879362 | 760553 | B | A | 0.48994 | -0.00494 | 0.000986 | 0.00000055 | 6.258774 | 0 | 0.879362 | 1% |
| 12 | WU_10.2_12_956257 | 808415 | B | A | 0.48994 | -0.00494 | 0.000986 | 0.00000055 | 6.258774 | 0 | 0.956257 | 1% |
| 12 | 12_1030120 | 924947 | A | B | 0.489911 | -0.00493 | 0.000986 | 0.00000058 | 6.235108 | 0 | 1.03012 | 1% |
| 12 | 12_1047496 | 938644 | A | B | 0.489911 | -0.00493 | 0.000986 | 0.00000058 | 6.235108 | 0 | 1.047496 | 1% |
| 12 | WU_10.2_12_985539 | 905111 | A | B | 0.489825 | -0.00492 | 0.000986 | 0.00000059 | 6.229975 | 0 | 0.985539 | 1% |
| 12 | WU_10.2_12_1846468 | 1945209 | A | B | 0.468094 | 0.004754 | 0.000962 | 0.00000077 | 6.114415 | 0 | 1.846468 | 1% |
| 11 | ALGA0062295 | 48945093 | B | A | 0.114861 | 0.006303 | 0.001278 | 0.00000081 | 6.092159 | 0 | 53.58303 | 1% |
| 3 | MARC0050497 | not mapped | B | A | 0.069302 | 0.007594 | 0.001545 | 0.00000089 | 6.05087 | 0 | 78.47999 | 1% |
| 13 | WU_10.2_13_213533885 | 203284414 | A | B | 0.441477 | 0.003874 | 0.000812 | 0.00000183 | 5.738361 | 0 | 213.5339 | 1% |
| 12 | WU_10.2_12_638405 | 178275 | B | A | 0.45516 | -0.00457 | 0.000959 | 0.00000191 | 5.719378 | 0 | 0.638405 | 1% |
| 13 | H3GA0038085 | 203672228 | A | B | 0.32219 | -0.00412 | 0.000866 | 0.00000196 | 5.708536 | 0 | 213.7354 | 1% |
| 13 | ASGA0060047 | 201648354 | A | B | 0.416556 | 0.004053 | 0.000855 | 0.00000213 | 5.672567 | 0 | 211.8413 | 1% |
| 13 | ASGA0060170 | 204213041 | A | B | 0.31213 | -0.00418 | 0.000884 | 0.00000221 | 5.656107 | 0 | 214.3682 | 1% |
| 12 | WU_10.2_12_2567793 | 2497540 | A | B | 0.436735 | 0.004602 | 0.000982 | 0.00000281 | 5.551906 | 0 | 2.567793 | 1% |
| 12 | ALGA0064329 | 2166472 | A | B | 0.414429 | 0.004456 | 0.000962 | 0.00000362 | 5.441673 | 0 | 2.118343 | 1% |
| 12 | WU_10.2_12_1607100 | 1702151 | A | B | 0.456769 | 0.004621 | 0.001004 | 0.00000422 | 5.374516 | 0 | 1.6071 | 1% |
| 12 | ASGA0104982 | not mapped | A | B | 0.458695 | 0.004576 | 0.001008 | 0.00000559 | 5.252295 | 0 | 1.656436 | 1% |
| 12 | WU_10.2_12_1629873 | 1724920 | B | A | 0.458724 | 0.004573 | 0.001008 | 0.00000569 | 5.245156 | 0 | 1.629873 | 1% |
| 12 | WU_10.2_12_1699203 | 1794101 | A | B | 0.458839 | 0.004554 | 0.001008 | 0.00000618 | 5.209008 | 0 | 1.699203 | 1% |
| 12 | ASGA0102105 | 1870423 | B | A | 0.458781 | 0.004553 | 0.001008 | 0.00000623 | 5.205254 | 0 | 1.801937 | 1% |
| 12 | MIGA0015764 | 2096738 | B | A | 0.459155 | 0.004545 | 0.001007 | 0.00000632 | 5.199533 | 0 | 1.998701 | 1% |
| 12 | WU_10.2_12_1967000 | 2065096 | B | A | 0.459212 | 0.004545 | 0.001007 | 0.00000632 | 5.198943 | 0 | 1.967 | 1% |
| 12 | H3GA0056177 | 1447000 | B | A | 0.486433 | 0.004456 | 0.001011 | 0.00000645 | 5.190532 | 0 | 1.28985 | 1% |
| 13 | WU_10.2_13_213798197 | 203695504 | B | A | 0.296579 | -0.00402 | 0.000893 | 0.00000656 | 5.182859 | 0 | 213.7982 | 1% |
| 12 | ASGA0052462 | 1966528 | B | A | 0.459299 | 0.004533 | 0.001007 | 0.00000672 | 5.172721 | 0 | 1.867615 | 1% |

Figure 3B

| | | | | | | | | | | |
|---|---|---|---|---|---|---|---|---|---|---|
| 12 | ALGA0064320 | 2047563 | B | A | 0.459184 | 0.00453 | 0.001007 | 0.00000679 | 5.168236 | 0 | 1.949462 | 1% |
| 12 | ASGA0052479 | 2145858 | B | A | 0.45927 | 0.004528 | 0.001007 | 0.00000686 | 5.163545 | 0 | 2.097504 | 1% |
| 12 | WU_10.2_12_1823686 | 1922451 | A | B | 0.459385 | 0.004529 | 0.001007 | 0.00000688 | 5.162579 | 0 | 1.823686 | 1% |
| 12 | WU_10.2_12_1673966 | 1768875 | B | A | 0.455073 | 0.004479 | 0.000999 | 0.00000732 | 5.135709 | 0 | 1.673966 | 1% |
| 12 | WU_10.2_12_1490490 | 1584935 | B | A | 0.460563 | 0.004498 | 0.001007 | 0.00000799 | 5.097601 | 0 | 1.49049 | 1% |
| 12 | WU_10.2_12_1474245 | 1568698 | A | B | 0.497499 | -0.00447 | 0.001003 | 0.00000819 | 5.086574 | 0 | 1.474245 | 1% |
| 12 | ALGA0064322 | 2129234 | A | B | 0.475223 | 0.004431 | 0.000997 | 0.00000876 | 5.057377 | 0 | 2.081249 | 1% |
| 13 | ASGA0097407 | 205336372 | B | A | 0.461972 | -0.00354 | 0.000797 | 0.00000919 | 5.036515 | 0 | 215.6623 | 1% |
| 12 | 12_1556830 | 1651145 | B | A | 0.467692 | 0.004405 | 0.000996 | 0.00000978 | 5.019508 | 0 | 1.55683 | 1% |
| 12 | WU_10.2_12_1106466 | 1263381 | A | B | 0.48146 | 0.004381 | 0.000991 | 0.00000987 | 5.005795 | 0 | 1.106466 | 1% |
| 13 | ALGA0115086 | 205337210 | B | A | 0.461023 | -0.00352 | 0.000797 | 0.00000987 | 5.005493 | 0 | 215.6631 | 1% |
| 12 | ASGA0084331 | 1326789 | B | A | 0.450963 | 0.004247 | 0.000961 | 0.00000995 | 5.002324 | 0 | 1.169606 | 1% |
| 12 | WU_10.2_12_1516612 | 1610942 | A | A | 0.459356 | 0.004446 | 0.001007 | 0.00001018 | 4.992397 | 0 | 1.516612 | 1% |
| 12 | H3GA0032997 | not mapped | B | A | 0.450043 | 0.004317 | 0.000982 | 0.00001107 | 4.955672 | 0 | 2.553605 | 1% |
| 13 | WU_10.2_13_213661103 | 203588501 | B | A | 0.100719 | 0.005604 | 0.001296 | 0.00001521 | 4.817874 | 0 | 213.6611 | 1% |
| 13 | INRA0041776 | 204979508 | A | B | 0.344639 | 0.00371 | 0.000858 | 0.00001532 | 4.814636 | 0 | 215.2357 | 1% |
| 12 | WU_10.2_12_1383921 | 1490573 | B | A | 0.486347 | 0.004311 | 0.001011 | 0.00001999 | 4.69917 | 0 | 1.383921 | 1% |
| 12 | WU_10.2_12_60100 | 714757 | A | B | 0.384047 | -0.00407 | 0.000956 | 0.00002033 | 4.691839 | 0 | 0.0601 | 1% |
| 12 | WU_10.2_12_1279 | 709605 | A | B | 0.384047 | -0.00407 | 0.000956 | 0.00002034 | 4.691715 | 0 | 0.001279 | 1% |
| 12 | ALGA0114338 | 3315538 | A | B | 0.502903 | 0.003678 | 0.000866 | 0.00002171 | 4.663392 | 0 | 3.355504 | 1% |
| 12 | ASGA0052517 | 2510309 | A | B | 0.492785 | -0.00361 | 0.00085 | 0.00002228 | 4.652075 | 0 | 2.580572 | 1% |
| 13 | ALGA0073987 | 204285695 | B | A | 0.267634 | -0.00392 | 0.000928 | 0.00002442 | 4.612276 | 0 | 214.4414 | 1% |
| 12 | WU_10.2_12_1218661 | 1374330 | A | A | 0.493446 | 0.00412 | 0.000978 | 0.00002525 | 4.597673 | 0 | 1.218661 | 1% |
| 12 | MIGA0027235 | 518346 | B | B | 0.21236 | 0.00428 | 0.00102 | 0.00002702 | 4.568368 | 0 | 0.219672 | 1% |
| 13 | ASGA0060238 | 2049959669 | A | A | 0.463409 | 0.003387 | 0.00081 | 0.00002918 | 4.534918 | 0 | 215.2155 | 1% |
| 13 | ALGA0074054 | 205031120 | B | A | 0.353262 | 0.00357 | 0.000854 | 0.00002929 | 4.533287 | 0 | 215.2875 | 1% |
| 13 | ALGA0074022 | 2048277712 | B | A | 0.2203622 | 0.004188 | 0.001007 | 0.00003201 | 4.494763 | 0 | 215.0301 | 1% |

Figure 3C

| | | | | | | | | | | | |
|---|---|---|---|---|---|---|---|---|---|---|---|
| 13 | WU_10.2_13_216267790 | 205927897 | B | A | 0.44852 | 0.003421 | 0.000823 | 0.00003233 | 4.490331 | 0 | 216.2678 | 1% |
| 13 | ALGA0107287 | 205362091 | B | A | 0.254843 | -0.00371 | 0.000903 | 0.00003907 | 4.408178 | 0 | 215.6971 | 1% |
| 13 | MARC0049291 | 204480820 | A | B | 0.22952 | -0.00408 | 0.000993 | 0.00003980 | 4.400082 | 0 | 214.6383 | 1% |
| 13 | ALGA0074019 | 204798820 | B | A | 0.060535 | 0.006895 | 0.001726 | 0.00006481 | 4.188326 | 0 | 215.0588 | 1% |
| 13 | ALGA0072282 | 143973797 | B | A | 0.314429 | 0.003883 | 0.000986 | 0.00008245 | 4.083806 | 0 | 153.438 | 1% |
| 13 | ALGA0072286 | 143988152 | B | A | 0.314631 | 0.003878 | 0.000986 | 0.00008414 | 4.075008 | 0 | 153.4252 | 1% |
| 13 | ALGA0072288 | 144000293 | B | A | 0.314602 | 0.003879 | 0.000986 | 0.00008432 | 4.07405 | 0 | 153.413 | 1% |
| 13 | ASGA0060053 | 201701117 | B | A | 0.344179 | -0.00349 | 0.000902 | 0.00010617 | 3.973982 | 0 | 211.7894 | 1% |
| 12 | 12_4432363 | 4634383 | A | B | 0.468094 | -0.0032 | 0.000828 | 0.00011061 | 3.956225 | 0 | 4.432363 | 1% |
| 13 | ASGA0060016 | 201363365 | A | B | 0.38261 | 0.003415 | 0.000885 | 0.00011393 | 3.943377 | 0 | 211.4567 | 1% |
| 13 | ASGA0060050 | 201672666 | A | B | 0.343403 | -0.00347 | 0.000902 | 0.00011941 | 3.922952 | 0 | 211.8168 | 1% |
| 13 | ALGA0113058 | 201993760 | A | B | 0.216212 | 0.003788 | 0.000999 | 0.00015058 | 3.822244 | 0 | 212.079 | 1% |
| 13 | MIGA0017928 | 205067325 | A | B | 0.190313 | 0.003798 | 0.001008 | 0.00016405 | 3.785029 | 0 | 215.3239 | 1% |
| 13 | CASI0008730 | 201041664 | A | B | 0.324748 | -0.0034 | 0.000904 | 0.00016833 | 3.773849 | 0 | 211.1297 | 1% |
| 13 | ASGA0060025 | 201437723 | A | B | 0.360132 | -0.00334 | 0.0009 | 0.00020954 | 3.678731 | 0 | 211.5261 | 1% |
| 13 | H3GA0038148 | 205007538 | B | A | 0.237798 | -0.00348 | 0.000945 | 0.00023032 | 3.637666 | 0 | 215.2639 | 1% |
| 13 | ALGA0073877 | 201510051 | A | B | 0.374792 | 0.003279 | 0.000891 | 0.00023498 | 3.628971 | 0 | 211.5977 | 1% |
| 13 | MARC0084792 | 49428889 | A | B | 0.049037 | 0.007111 | 0.001941 | 0.00024769 | 3.606097 | 0 | 54.39305 | 1% |
| 13 | MARC0061987 | 205918016 | B | A | 0.496953 | 0.002992 | 0.000825 | 0.00028915 | 3.538871 | 0 | 216.2777 | 1% |
| 13 | ASGA0093664 | 176922207 | A | B | 0.181374 | 0.004622 | 0.001279 | 0.00030234 | 3.51951 | 0 | 187.3284 | 1% |
| 13 | WU_10.2_13_211105236 | 201017161 | B | A | 0.390055 | 0.003156 | 0.000878 | 0.00032498 | 3.488147 | 0 | 211.1052 | 1% |
| 12 | ASGA0052541 | 4528065 | B | A | 0.452113 | -0.00297 | 0.000828 | 0.00032951 | 3.482138 | 0 | 4.275278 | 1% |
| 12 | WU_10.2_12_3550236 | 3507954 | B | A | 0.409198 | -0.00317 | 0.000884 | 0.00033192 | 3.478973 | 0 | 3.550236 | 1% |
| 13 | MARC0046262 | not mapped | A | A | 0.106611 | 0.005238 | 0.00146 | 0.00033509 | 3.474836 | 0 | 54.66301 | 1% |
| 12 | WU_10.2_12_4849449 | 4997728 | A | B | 0.480339 | 0.003 | 0.00084 | 0.00035576 | 3.448845 | 0 | 4.849449 | 1% |
| 12 | WU_10.2_12_4154172 | not mapped | B | A | 0.490342 | -0.00305 | 0.000857 | 0.00038017 | 3.420018 | 0 | 4.154172 | 1% |
| 12 | WU_10.2_12_3868856 | 4121627 | A | B | 0.488129 | -0.0029 | 0.000815 | 0.00038407 | 3.415592 | 0 | 3.868856 | 1% |

Figure 3D

| | | | | | | | | |
|---|---|---|---|---|---|---|---|---|
| 13 | M1GA0017847 | 203713415 | A | B | 0.341161 | 0.002923 | 0.000847 | 0.00055678 | 3.254318 | 0 | 213.8162 | 1% |
| 12 | ASGA0084858 | 3289920 | A | B | 0.381719 | -0.00309 | 0.000898 | 0.00057334 | 3.241586 | 0 | 3.329538 | 1% |
| 13 | MARC0021368 | 50392004 | B | A | 0.047801 | 0.006684 | 0.001965 | 0.00067158 | 3.172905 | 0 | 55.47396 | 1% |
| 13 | ALGA0073927 | 202363339 | B | A | 0.429865 | -0.0029 | 0.000857 | 0.00070648 | 3.150898 | 0 | 212.489 | 1% |
| 12 | H3GA0053789 | 3473632 | B | A | 0.375424 | -0.003 | 0.000899 | 0.00084828 | 3.071463 | 0 | 3.59409 | 1% |
| 13 | ASGA0058653 | 103646032 | B | A | 0.246335 | 0.003597 | 0.00108 | 0.00086589 | 3.062536 | 0 | 112.0661 | 1% |
| 13 | H3GA0037158 | 103795025 | B | A | 0.246306 | 0.003597 | 0.00108 | 0.00086683 | 3.062066 | 0 | 112.2155 | 1% |
| 13 | WU_10.2_13_211474419 | 201381083 | B | A | 0.321127 | 0.003022 | 0.000909 | 0.00089126 | 3.049996 | 0 | 211.4744 | 1% |
| 13 | ASGA0060079 | 201926350 | B | A | 0.37071 | -0.00297 | 0.000896 | 0.00091686 | 3.037697 | 0 | 212.0116 | 1% |
| 13 | ASGA0060262 | 206014277 | B | A | 0.431618 | 0.002783 | 0.000842 | 0.00095360 | 3.020632 | 0 | 216.426 | 1% |
| 13 | WU_10.2_13_186735796 | 176309381 | A | B | 0.232021 | 0.003719 | 0.001141 | 0.00111114 | 2.954231 | 0 | 186.7358 | 1% |
| 13 | ALGA0107889 | 176923375 | A | B | 0.211814 | 0.003775 | 0.001159 | 0.00112674 | 2.948176 | 0 | 187.3296 | 1% |
| 13 | ALGA0072959 | 177386304 | A | B | 0.173556 | 0.004151 | 0.001276 | 0.00113707 | 2.944213 | 0 | 187.6968 | 1% |
| 13 | ALGA0070053 | 49874667 | A | B | 0.106266 | 0.004756 | 0.001463 | 0.00115294 | 2.938193 | 0 | 54.9073 | 1% |
| 13 | M1GA0017541 | 49772824 | B | A | 0.105979 | 0.004753 | 0.001464 | 0.00117086 | 2.931495 | 0 | 54.80452 | 1% |
| 13 | MARC0047577 | 89961949 | B | A | 0.172435 | 0.004405 | 0.001363 | 0.00122496 | 2.911878 | 0 | 98.01672 | 1% |
| 13 | ALGA0070042 | 49361883 | B | A | 0.04898 | 0.006211 | 0.001943 | 0.00138880 | 2.85736 | 0 | 54.36782 | 1% |
| 13 | WU_10.2_13_198189993 | 188265845 | A | A | 0.089509 | 0.004564 | 0.001428 | 0.00139345 | 2.855909 | 0 | 198.19 | 1% |
| 13 | WU_10.2_13_216370588 | 205958867 | B | A | 0.435499 | 0.002648 | 0.000829 | 0.00139749 | 2.854651 | 0 | 216.3706 | 1% |
| 13 | ALGA0113149 | not mapped | A | B | 0.180512 | 0.003824 | 0.001202 | 0.00147142 | 2.832263 | 0 | 25.07318 | 1% |
| 13 | ALGA0103510 | 22569541 | B | A | 0.244266 | 0.003283 | 0.001033 | 0.00147635 | 2.830811 | 0 | 24.47562 | 1% |
| 13 | WU_10.2_13_211292968 | 201174143 | A | A | 0.394826 | 0.002791 | 0.000879 | 0.00150046 | 2.823776 | 0 | 211.293 | 1% |
| 13 | H3GA0038015 | 201165703 | A | A | 0.39474 | 0.002788 | 0.000879 | 0.00152341 | 2.817183 | 0 | 211.2537 | 1% |
| 13 | M1GA0017861 | 204308701 | A | B | 0.498419 | 0.002629 | 0.000836 | 0.00165263 | 2.781824 | 0 | 214.4651 | 1% |
| 13 | WU_10.2_13_210855768 | 200767905 | A | A | 0.477436 | 0.002573 | 0.000821 | 0.00173185 | 2.76149 | 0 | 210.8558 | 5% |
| 13 | ALGA0073505 | 190711065 | A | B | 0.293216 | 0.002839 | 0.000909 | 0.00178320 | 2.7488 | 0 | 200.7301 | 5% |
| 13 | WU_10.2_13_196098287 | 186247741 | B | A | 0.343662 | -0.0027 | 0.000865 | 0.00180474 | 2.743585 | 0 | 196.0983 | 5% |

Figure 3E

| 13 | DRGA0013338 | 186315012 | B | A | 0.343691 | -0.0027 | 0.000865 | 0.00181409 | 2.741341 | 0 | 196.1656 | 5% |
| 13 | MARC0083424 | 205987622 | B | A | 0.321587 | 0.002746 | 0.000883 | 0.00187125 | 2.727868 | 0 | 216.3993 | 5% |
| 13 | WU_10.2_13_213901046 | 203754506 | A | B | 0.427077 | 0.002583 | 0.000832 | 0.00189251 | 2.722962 | 0 | 213.901 | 5% |
| 13 | MIGA0017934 | 205938845 | A | B | 0.403507 | 0.002588 | 0.000834 | 0.00192095 | 2.716484 | 0 | 216.2568 | 5% |

Figure 3F

| Chr | SNP | bp v11.1 | A1 | A2 | Freq | b | se | p | lp | g_FDR | pos | c_FDR |
|---|---|---|---|---|---|---|---|---|---|---|---|---|
| 13 | WU_10.2_13_213405073 | 203413076 | A | B | 0.214544 | 0.007983 | 0.000987 | 0.000000000 | 15.21173 | 0 | 213.4051 | 1% |
| 12 | WU_10.2_12_3372358 | 3332538 | A | B | 0.304628 | 0.005959 | 0.000935 | 0.000000000 | 9.735343 | 0 | 3.372358 | 1% |
| 12 | MARC0034096 | 1814027 | A | B | 0.280713 | 0.006358 | 0.001001 | 0.000000000 | 9.673662 | 0 | 1.716991 | 1% |
| 12 | MARC0027230 | 1809297 | B | A | 0.281661 | 0.006278 | 0.000998 | 0.000000000 | 9.496228 | 0 | 1.712329 | 1% |
| 13 | ALGA0102629 | 203165762 | B | A | 0.059155 | 0.010445 | 0.001697 | 0.000000000 | 9.125249 | 0 | 213.229 | 1% |
| 12 | ASGA0052511 | 2551640 | A | A | 0.334751 | 0.005438 | 0.000953 | 0.000000001 | 7.93319 | 0 | 2.621917 | 1% |
| 12 | WU_10.2_12_3576717 | 3455925 | A | B | 0.423541 | 0.004765 | 0.000866 | 0.000000004 | 7.428132 | 0 | 3.576717 | 1% |
| 12 | WU_10.2_12_3462115 | 3422237 | A | B | 0.422938 | 0.004753 | 0.000867 | 0.000000004 | 7.382588 | 0 | 3.462115 | 1% |
| 12 | MARC0063090 | 1893069 | A | B | 0.353061 | 0.005227 | 0.000955 | 0.000000004 | 7.350431 | 0 | 1.779278 | 1% |
| 12 | WU_10.2_12_3518581 | 3428663 | A | B | 0.431647 | 0.004689 | 0.000859 | 0.000000005 | 7.31202 | 0 | 3.518581 | 1% |
| 12 | ASGA0052467 | 1987101 | A | B | 0.35378 | 0.005175 | 0.000954 | 0.000000006 | 7.240042 | 0 | 1.888177 | 1% |
| 13 | ASGA0060211 | 204883958 | A | B | 0.296551 | -0.00475 | 0.000895 | 0.000000011 | 6.940781 | 0 | 214.9738 | 1% |
| 13 | ASGA0098605 | 203230199 | A | B | 0.22265 | 0.004988 | 0.000952 | 0.000000016 | 6.797882 | 0 | 213.5881 | 1% |
| 12 | WU_10.2_12_3522238 | 3432164 | A | B | 0.44507 | 0.004454 | 0.000858 | 0.000000021 | 6.67781 | 0 | 3.522238 | 1% |
| 12 | WU_10.2_12_815170 | 146373 | A | B | 0.483242 | -0.00501 | 0.000968 | 0.000000022 | 6.648383 | 0 | 0.81517 | 1% |
| 13 | H3GA0055340 | 658326 | B | A | 0.486807 | -0.00509 | 0.000987 | 0.000000025 | 6.598946 | 0 | 0.079502 | 1% |
| 12 | WU_10.2_12_11102 | 699579 | B | A | 0.486979 | -0.00509 | 0.000987 | 0.000000026 | 6.593361 | 0 | 0.011102 | 1% |
| 13 | WU_10.2_13_213415696 | 203402453 | A | B | 0.274734 | 0.004671 | 0.000908 | 0.000000027 | 6.568127 | 0 | 213.4157 | 1% |
| 13 | 13_213436825 | 203381327 | B | A | 0.317419 | 0.004495 | 0.000874 | 0.000000027 | 6.563871 | 0 | 213.4368 | 1% |
| 12 | ASGA0099260 | 489991 | B | A | 0.480052 | -0.00503 | 0.000979 | 0.000000028 | 6.546717 | 0 | 0.248014 | 1% |
| 12 | MARC0089921 | 547357 | B | A | 0.480109 | -0.00503 | 0.000979 | 0.000000029 | 6.54475 | 0 | 0.190362 | 1% |
| 12 | MARC0013397 | 528795 | B | A | 0.480109 | -0.00503 | 0.000979 | 0.000000029 | 6.54475 | 0 | 0.20921 | 1% |
| 12 | WU_10.2_12_145034 | 592677 | A | B | 0.480167 | -0.00503 | 0.000979 | 0.000000029 | 6.544557 | 0 | 0.145034 | 1% |
| 12 | ASGA0052435 | 248447 | A | B | 0.482869 | -0.00497 | 0.00097 | 0.000000030 | 6.528551 | 0 | 0.490194 | 1% |
| 12 | WU_10.2_12_674191 | not mapped | A | B | 0.48695 | 0.004827 | 0.000945 | 0.000000032 | 6.491565 | 0 | 0.674191 | 1% |
| 12 | WU_10.2_12_338561 | 399073 | B | A | 0.476832 | -0.00496 | 0.000977 | 0.000000040 | 6.401404 | 0 | 0.338561 | 1% |

Figure 4A

| | | | | | | | | | | | |
|---|---|---|---|---|---|---|---|---|---|---|---|
| 12 | ASGA0089998 | 824959 | A | B | 0.489997 | -0.00494 | 0.000986 | 0.00000054 | 6.271641 | 0 | 0.940547 | 1% |
| 12 | WU_10.2_12_890035 | 711015 | A | B | 0.489968 | -0.00494 | 0.000986 | 0.00000054 | 6.267404 | 0 | 0.890035 | 1% |
| 12 | WU_10.2_12_879362 | 760553 | B | A | 0.48994 | -0.00494 | 0.000986 | 0.000000055 | 6.258774 | 0 | 0.879362 | 1% |
| 12 | WU_10.2_12_956257 | 808415 | B | A | 0.48994 | -0.00494 | 0.000986 | 0.000000055 | 6.258774 | 0 | 0.956257 | 1% |
| 12 | 12_1030120 | 924947 | A | B | 0.489911 | -0.00493 | 0.000986 | 0.000000058 | 6.235108 | 0 | 1.030012 | 1% |
| 12 | 12_1047496 | 938644 | A | B | 0.489911 | -0.00493 | 0.000986 | 0.000000058 | 6.235108 | 0 | 1.047496 | 1% |
| 12 | WU_10.2_12_985539 | 905111 | A | B | 0.489825 | -0.00492 | 0.000986 | 0.000000059 | 6.229975 | 0 | 0.985539 | 1% |
| 12 | WU_10.2_12_1846468 | 1945209 | A | B | 0.468094 | 0.004754 | 0.000962 | 0.000000077 | 6.114415 | 0 | 1.846468 | 1% |
| 11 | ALGA0062295 | 48945093 | B | A | 0.114861 | 0.006303 | 0.001278 | 0.000000081 | 6.092159 | 0 | 53.58303 | 1% |
| 3 | MARC0050497 | not mapped | B | A | 0.069302 | 0.007594 | 0.001545 | 0.000000089 | 6.05087 | 0 | 78.47999 | 1% |
| 13 | WU_10.2_13_213533885 | 203284414 | A | B | 0.441477 | 0.003874 | 0.000812 | 0.000000183 | 5.738361 | 0 | 213.5339 | 1% |
| 12 | WU_10.2_12_638405 | 178275 | B | A | 0.45516 | -0.00457 | 0.000959 | 0.000000191 | 5.719378 | 0 | 0.638405 | 1% |
| 13 | H3GA0038085 | 203672228 | A | B | 0.32219 | -0.00412 | 0.000866 | 0.000000196 | 5.708536 | 0 | 213.7354 | 1% |
| 13 | ASGA0060047 | 201648354 | B | A | 0.416556 | 0.004053 | 0.000855 | 0.000000213 | 5.672567 | 0 | 211.8413 | 1% |
| 13 | ASGA0060170 | 204213041 | A | B | 0.31213 | -0.00418 | 0.000884 | 0.000000221 | 5.656107 | 0 | 214.3682 | 1% |
| 12 | WU_10.2_12_2567793 | 2497540 | A | B | 0.436735 | 0.004602 | 0.000982 | 0.000000281 | 5.551906 | 0 | 2.567793 | 1% |
| 12 | ALGA0064329 | 2166472 | A | B | 0.414429 | 0.004456 | 0.000962 | 0.000000362 | 5.441673 | 0 | 2.118343 | 1% |
| 12 | WU_10.2_12_1607100 | 1702151 | A | B | 0.456769 | 0.004621 | 0.001004 | 0.000000422 | 5.374516 | 0 | 1.6071 | 1% |
| 12 | ASGA0104982 | not mapped | A | B | 0.458695 | 0.004576 | 0.001008 | 0.000000559 | 5.252295 | 0 | 1.656436 | 1% |
| 12 | WU_10.2_12_1629873 | 1724920 | B | A | 0.458724 | 0.004573 | 0.001008 | 0.000000569 | 5.245156 | 0 | 1.629873 | 1% |
| 12 | WU_10.2_12_1699203 | 1794101 | A | B | 0.458839 | 0.004554 | 0.001008 | 0.000000618 | 5.209008 | 0 | 1.699203 | 1% |
| 12 | ASGA0102105 | 1870423 | B | A | 0.458781 | 0.004553 | 0.001008 | 0.000000623 | 5.205254 | 0 | 1.801937 | 1% |
| 12 | M1GA0015764 | 2096738 | B | A | 0.459155 | 0.004545 | 0.001007 | 0.000000632 | 5.199533 | 0 | 1.998701 | 1% |
| 12 | WU_10.2_12_1967000 | 2065096 | B | A | 0.459212 | 0.004545 | 0.001007 | 0.000000632 | 5.198943 | 0 | 1.967 | 1% |
| 12 | H3GA0056177 | 1447000 | B | A | 0.486433 | 0.004456 | 0.001011 | 0.000000645 | 5.190532 | 0 | 1.28985 | 1% |
| 13 | WU_10.2_13_213798197 | 203695504 | B | A | 0.296579 | -0.00402 | 0.000893 | 0.000000656 | 5.182859 | 0 | 213.7982 | 1% |
| 12 | ASGA0052462 | 1966528 | B | A | 0.459299 | 0.004533 | 0.001007 | 0.000000672 | 5.172721 | 0 | 1.867615 | 1% |

Figure 4B

| | | | | | | | | | | |
|---|---|---|---|---|---|---|---|---|---|---|
| 12 | ALGA0064320 | 2047563 | B | A | 0.459184 | 0.00453 | 0.001007 | 0.00000679 | 5.168236 | 0 | 1.949462 | 1% |
| 12 | ASGA0052479 | 2145858 | B | A | 0.45927 | 0.004528 | 0.001007 | 0.00000686 | 5.163545 | 0 | 2.097504 | 1% |
| 12 | WU_10.2_12_1823686 | 1922451 | A | B | 0.459385 | 0.004529 | 0.001007 | 0.00000688 | 5.162579 | 0 | 1.823686 | 1% |
| 12 | WU_10.2_12_1673966 | 1768875 | B | A | 0.455073 | 0.004479 | 0.000999 | 0.00000732 | 5.135709 | 0 | 1.673966 | 1% |
| 12 | WU_10.2_12_1490490 | 1584935 | B | A | 0.460563 | 0.004498 | 0.001007 | 0.00000799 | 5.097601 | 0 | 1.49049 | 1% |
| 12 | WU_10.2_12_1474245 | 1568698 | A | B | 0.497499 | -0.00447 | 0.001003 | 0.00000819 | 5.086574 | 0 | 1.474245 | 1% |
| 12 | ALGA0064322 | 2129234 | A | B | 0.475223 | 0.004431 | 0.000997 | 0.00000876 | 5.057377 | 0 | 2.081249 | 1% |
| 13 | ASGA0097407 | 205336372 | B | A | 0.461972 | -0.00354 | 0.000797 | 0.00000919 | 5.036515 | 0 | 215.6623 | 1% |
| 12 | 12_1556830 | 1651145 | B | A | 0.467692 | 0.004405 | 0.000996 | 0.00000978 | 5.009508 | 0 | 1.55683 | 1% |
| 12 | WU_10.2_12_1106466 | 1263381 | A | B | 0.48146 | 0.004381 | 0.000991 | 0.00000987 | 5.005795 | 0 | 1.106466 | 1% |
| 13 | ALGA0115086 | 205337210 | B | A | 0.461023 | -0.00352 | 0.000797 | 0.00000987 | 5.005493 | 0 | 215.6631 | 1% |
| 13 | ASGA0084331 | 1326789 | B | A | 0.450963 | 0.004247 | 0.000961 | 0.00000995 | 5.002324 | 0 | 1.169606 | 1% |
| 12 | WU_10.2_12_1516612 | 1610942 | B | A | 0.459356 | 0.004446 | 0.001007 | 0.00001018 | 4.992397 | 0 | 1.516612 | 1% |
| 12 | H3GA0032997 | not mapped | B | A | 0.450043 | 0.004317 | 0.000982 | 0.00001107 | 4.955672 | 0 | 2.553605 | 1% |
| 13 | WU_10.2_13_213661103 | 203588501 | B | A | 0.100719 | 0.005604 | 0.001296 | 0.00001521 | 4.817874 | 0 | 213.6611 | 1% |
| 13 | INRA0041776 | 204979508 | A | B | 0.344639 | 0.00371 | 0.000858 | 0.00001532 | 4.814636 | 0 | 215.2357 | 1% |
| 12 | WU_10.2_12_1383921 | 1490573 | B | A | 0.486347 | 0.004311 | 0.001011 | 0.00001999 | 4.69917 | 0 | 1.383921 | 1% |
| 12 | WU_10.2_12_60100 | 714757 | A | B | 0.384047 | -0.00407 | 0.000956 | 0.00002033 | 4.691839 | 0 | 0.0601 | 1% |
| 12 | WU_10.2_12_1279 | 709605 | A | B | 0.384047 | -0.00407 | 0.000956 | 0.00002034 | 4.691715 | 0 | 0.001279 | 1% |
| 12 | ALGA0114338 | 3315538 | A | B | 0.502903 | 0.003678 | 0.000866 | 0.00002171 | 4.663392 | 0 | 3.355504 | 1% |
| 12 | ASGA0052517 | 2510309 | A | B | 0.492785 | -0.00361 | 0.00085 | 0.00002228 | 4.652075 | 0 | 2.580572 | 1% |
| 13 | ALGA0073987 | 204285695 | B | A | 0.267634 | -0.00392 | 0.000928 | 0.00002442 | 4.612276 | 0 | 214.4414 | 1% |
| 12 | WU_10.2_12_1218661 | 1374330 | B | A | 0.493446 | 0.00412 | 0.000978 | 0.00002525 | 4.597673 | 0 | 1.218661 | 1% |
| 12 | M1GA0027235 | 518346 | A | B | 0.21236 | 0.00428 | 0.00102 | 0.00002702 | 4.568368 | 0 | 0.219672 | 1% |
| 13 | ASGA0060238 | 204959669 | B | A | 0.463409 | 0.003387 | 0.00081 | 0.00002918 | 4.534918 | 0 | 215.2155 | 1% |
| 13 | ALGA0074054 | 205031120 | B | A | 0.353262 | 0.00357 | 0.000854 | 0.00002929 | 4.533287 | 0 | 215.2875 | 1% |
| 13 | ALGA0074022 | 204827712 | B | A | 0.203622 | 0.004188 | 0.001007 | 0.00003201 | 4.494763 | 0 | 215.0301 | 1% |

Figure 4C

| Chr | Marker | Position | A1 | A2 | V1 | V2 | V3 | V4 | V5 | V6 | % |
|---|---|---|---|---|---|---|---|---|---|---|---|
| 13 | WU_10.2_13_216267790 | 205927897 | B | A | 0.44852 | 0.003421 | 0.000823 | 0.00003233 | 4.490331 | 0 | 216.2678 | 1% |
| 13 | ALGA0107287 | 205362091 | B | A | 0.254843 | -0.00371 | 0.000903 | 0.00003907 | 4.408178 | 0 | 215.6971 | 1% |
| 13 | MARC0049291 | 204480820 | A | A | 0.22952 | -0.00408 | 0.000993 | 0.00003980 | 4.400082 | 0 | 214.6383 | 1% |
| 13 | ALGA0074019 | 204798820 | B | B | 0.060535 | 0.006895 | 0.001726 | 0.00006481 | 4.188326 | 0 | 215.0588 | 1% |
| 13 | ALGA0072282 | 143973797 | B | A | 0.314429 | 0.003883 | 0.000986 | 0.00008245 | 4.083806 | 0 | 153.438 | 1% |
| 13 | ALGA0072286 | 143988152 | B | A | 0.314631 | 0.003878 | 0.000986 | 0.00008414 | 4.075008 | 0 | 153.4252 | 1% |
| 13 | ALGA0072288 | 144000293 | B | A | 0.314602 | 0.003879 | 0.000986 | 0.00008432 | 4.07405 | 0 | 153.413 | 1% |
| 13 | ASGA0060053 | 201701117 | B | A | 0.344179 | -0.00349 | 0.000902 | 0.00010617 | 3.973982 | 0 | 211.7894 | 1% |
| 12 | 12_4432363 | 4634383 | A | B | 0.468094 | -0.0032 | 0.000828 | 0.000111061 | 3.956225 | 0 | 4.432363 | 1% |
| 13 | ASGA0060016 | 201363365 | A | B | 0.38261 | 0.003415 | 0.000885 | 0.000111393 | 3.943377 | 0 | 211.4567 | 1% |
| 13 | ASGA0060050 | 201672666 | B | B | 0.343403 | -0.00347 | 0.000902 | 0.000111941 | 3.922952 | 0 | 211.8168 | 1% |
| 13 | ALGA0113058 | 201993760 | A | B | 0.216212 | 0.003788 | 0.000999 | 0.000115058 | 3.822244 | 0 | 212.079 | 1% |
| 13 | MIGA0017928 | 205067325 | A | B | 0.190313 | 0.003798 | 0.001008 | 0.000116405 | 3.785029 | 0 | 215.3239 | 1% |
| 13 | CASI0008730 | 201041664 | B | B | 0.324748 | -0.0034 | 0.000904 | 0.000116833 | 3.773849 | 0 | 211.1297 | 1% |
| 13 | ASGA0060025 | 201437723 | A | B | 0.360132 | -0.00334 | 0.0009 | 0.000120954 | 3.678731 | 0 | 211.5261 | 1% |
| 13 | H3GA0038148 | 205007538 | B | B | 0.237798 | -0.00348 | 0.000945 | 0.000123032 | 3.637666 | 0 | 215.2639 | 1% |
| 13 | ALGA0073877 | 201510051 | A | B | 0.374792 | 0.003279 | 0.000891 | 0.000123498 | 3.628971 | 0 | 211.5977 | 1% |
| 13 | MARC0084792 | 49428889 | B | A | 0.049037 | 0.007111 | 0.001941 | 0.000124769 | 3.606097 | 0 | 54.39305 | 1% |
| 13 | MARC0061987 | 205918016 | B | A | 0.496953 | 0.002992 | 0.000825 | 0.000128915 | 3.538871 | 0 | 216.2777 | 1% |
| 13 | ASGA0093664 | 176922207 | A | B | 0.181374 | 0.004622 | 0.001279 | 0.000130234 | 3.51951 | 0 | 187.3284 | 1% |
| 13 | WU_10.2_13_211105236 | 201017161 | A | B | 0.390055 | 0.003156 | 0.000878 | 0.000132498 | 3.488147 | 0 | 211.1052 | 1% |
| 12 | ASGA0052541 | 4528065 | B | A | 0.452113 | -0.00297 | 0.000828 | 0.000132951 | 3.482138 | 0 | 4.275278 | 1% |
| 12 | WU_10.2_12_3550236 | 3507954 | B | A | 0.409198 | -0.00317 | 0.000884 | 0.000133192 | 3.478973 | 0 | 3.550236 | 1% |
| 13 | MARC0046262 | not mapped | A | B | 0.106611 | 0.005238 | 0.00146 | 0.000133509 | 3.474836 | 0 | 54.66301 | 1% |
| 12 | WU_10.2_12_4849449 | 4997728 | A | B | 0.480339 | 0.003 | 0.000084 | 0.000135576 | 3.448845 | 0 | 4.849449 | 1% |
| 12 | WU_10.2_12_4154172 | not mapped | B | A | 0.490342 | -0.00305 | 0.000857 | 0.000138017 | 3.420018 | 0 | 4.154172 | 1% |
| 12 | WU_10.2_12_3868856 | 4121627 | A | B | 0.488129 | -0.0029 | 0.000815 | 0.000138407 | 3.415592 | 0 | 3.868856 | 1% |

Figure 4D

| | | | | | | | | | |
|---|---|---|---|---|---|---|---|---|---|
| 13 | M1GA0017847 | 203713415 | A | B | 0.341161 | 0.002923 | 0.000847 | 0.00055678 | 3.254318 | 0 | 213.8162 | 1% |
| 12 | ASGA0084858 | 3289920 | A | B | 0.381719 | -0.00309 | 0.000898 | 0.00057334 | 3.241586 | 0 | 3.329538 | 1% |
| 13 | MARC0021368 | 50392004 | B | A | 0.047801 | 0.006684 | 0.001965 | 0.00067158 | 3.172905 | 0 | 55.47396 | 1% |
| 13 | ALGA0073927 | 202363339 | B | A | 0.429865 | -0.0029 | 0.000857 | 0.00070648 | 3.150898 | 0 | 212.489 | 1% |
| 12 | H3GA0053789 | 3473632 | B | A | 0.375424 | -0.003 | 0.000899 | 0.00084828 | 3.071463 | 0 | 3.59409 | 1% |
| 13 | ASGA0058653 | 103646032 | B | A | 0.246335 | 0.003597 | 0.00108 | 0.00086589 | 3.062536 | 0 | 112.0661 | 1% |
| 13 | H3GA0037158 | 103795025 | B | A | 0.246306 | 0.003597 | 0.00108 | 0.00086683 | 3.062066 | 0 | 112.2155 | 1% |
| 13 | WU_10.2_13_211474419 | 201381083 | B | A | 0.321127 | 0.003022 | 0.000909 | 0.00089126 | 3.049996 | 0 | 211.4744 | 1% |
| 13 | ASGA0060079 | 201926350 | B | A | 0.37071 | -0.00297 | 0.000896 | 0.00091686 | 3.037697 | 0 | 212.0116 | 1% |
| 13 | ASGA0060262 | 206014277 | B | A | 0.431618 | 0.002783 | 0.000842 | 0.00095360 | 3.020632 | 0 | 216.426 | 1% |
| 13 | WU_10.2_13_186735796 | 176309381 | A | B | 0.232021 | 0.003719 | 0.001141 | 0.00111114 | 2.954231 | 0 | 186.7358 | 1% |
| 13 | ALGA0107889 | 176923375 | A | B | 0.211814 | 0.003775 | 0.001159 | 0.00112674 | 2.948176 | 0 | 187.3296 | 1% |
| 13 | ALGA0072959 | 177386304 | A | B | 0.173556 | 0.004151 | 0.001276 | 0.00113707 | 2.944213 | 0 | 187.6968 | 1% |
| 13 | ALGA0070053 | 49874667 | A | B | 0.106266 | 0.004756 | 0.001463 | 0.00115294 | 2.938193 | 0 | 54.9073 | 1% |
| 13 | M1GA0017541 | 49772824 | A | B | 0.105979 | 0.004753 | 0.001464 | 0.00117086 | 2.931495 | 0 | 54.80452 | 1% |
| 13 | MARC0047577 | 89961949 | A | B | 0.172435 | 0.004405 | 0.001363 | 0.00122496 | 2.911878 | 0 | 98.01672 | 1% |
| 13 | ALGA0070042 | 49361883 | B | A | 0.04898 | 0.006211 | 0.001943 | 0.00138880 | 2.85736 | 0 | 54.36782 | 1% |
| 13 | WU_10.2_13_198189993 | 188265845 | B | A | 0.089509 | 0.004564 | 0.001428 | 0.00139345 | 2.855909 | 0 | 198.19 | 1% |
| 13 | WU_10.2_13_216370588 | 205988867 | B | A | 0.435499 | 0.002648 | 0.000829 | 0.00139749 | 2.854651 | 0 | 216.3706 | 1% |
| 13 | ALGA0113149 | not mapped | A | B | 0.180512 | 0.003824 | 0.001202 | 0.00147142 | 2.832263 | 0 | 25.07318 | 1% |
| 13 | ALGA0103510 | 22569541 | B | A | 0.244266 | 0.003283 | 0.001033 | 0.00147635 | 2.830811 | 0 | 24.47562 | 1% |
| 13 | WU_10.2_13_211292968 | 201174143 | B | A | 0.394826 | 0.002791 | 0.000879 | 0.00150046 | 2.823776 | 0 | 211.293 | 1% |
| 13 | H3GA0038015 | 201165703 | B | A | 0.39474 | 0.002788 | 0.000879 | 0.00152341 | 2.817183 | 0 | 211.2537 | 1% |
| 13 | M1GA0017861 | 204308701 | A | B | 0.498419 | 0.002629 | 0.000836 | 0.00165263 | 2.781824 | 0 | 214.4651 | 1% |
| 13 | WU_10.2_13_210855768 | 200767905 | A | B | 0.477436 | 0.002573 | 0.000821 | 0.00173185 | 2.76149 | 0 | 210.8558 | 5% |
| 13 | ALGA0073505 | 190711065 | A | B | 0.293216 | 0.002839 | 0.000909 | 0.00178320 | 2.7488 | 0 | 200.7301 | 5% |
| 13 | WU_10.2_13_196098287 | 186247741 | B | A | 0.343662 | -0.0027 | 0.000865 | 0.00180474 | 2.743585 | 0 | 196.0983 | 5% |

Figure 4E

| 13 | DRGA0013338 | B | A | 0.343691 | -0.0027 | 0.000865 | 0.00181409 | 2.741341 | 0 | 196.1656 | 5% |
| 13 | MARC0083424 | B | A | 0.321587 | 0.002746 | 0.000883 | 0.00187125 | 2.727868 | 0 | 216.3993 | 5% |
| 13 | WU_10.2_13_213901046 | A | B | 0.427077 | 0.002583 | 0.000832 | 0.00189251 | 2.722962 | 0 | 213.901 | 5% |
| 13 | MIGA0017934 | A | B | 0.403507 | 0.002588 | 0.000834 | 0.00192095 | 2.716484 | 0 | 216.2568 | 5% |

Figure 4F

METHODS FOR LOWERING THE INCIDENCE OF HEMORRHAGIC HEART DISEASE IN SWINE

REFERENCE TO RELATED APPLICATIONS

This application claims the benefit of U.S. Provisional Patent Application No. 63/159,296 filed Feb. 10, 2021, the entire disclosure of which is incorporated herein by reference.

REFERENCE TO SEQUENCE LISTING

This application includes a sequence listing that has been submitted electronically as an ASCII plain text file, which is hereby incorporated by reference in its entirety. Said ASCII plain text file, created on Mar. 9, 2022, is named ST-73US-1SeqListing.txt and is 612 bytes in size.

BACKGROUND OF THE INVENTION

Mulberry Heart Disease (MHD) is a disease of unknown etiology typically appearing in swine between two to four months of age but has appeared in swine as young as three weeks of age. According to Oropeza-Moe et al., "A descriptive report of the selenium distribution in tissues from pigs with mulberry heart disease (MHD," Porcine Health Management, (2019)5:17, the main gross lesions in swine that succumb to MHD are "straw-colored fluid in the pleural cavity, transudate with fibrin in the pericardium and edematous lungs." Moreover, "the myocardium appears mottled due to transmural hemorrhage and pale necrotic areas." Id. In addition to necrosis, "oxidative stress causes oxidative modifications of myofilament proteins like actin, titin and myosin and can thereby impair the contractility of myocytes," and "the above mentioned alterations in myocytes combined with macroscopic and microscopic lesions of MHD cases strongly suggest ventricular dysrhythmia followed by acute heart failure." Id. MHD diagnosis can be made "when the following microscopic heart lesions are observed: In acute cases interstitial hemorrhage is the main lesion, whereas in less acute cases degeneration and necrosis of myofibers, sometimes with mineralization, are observed." Id.

The prevalence of MHD within the swine production pyramid creates inefficiencies and ultimately hampers the rate of genetic progress. Swine production today can be represented by a multilevel pyramid, with certain offspring at each level used in the next lower level for breeding. The top level of the pyramid is the genetic nucleus (GN). The next levels from top to bottom are generally the daughter nucleus (DN), the multiplier, or multiplication unit, and finally the commercial level, generally comprising commercial farms where slaughter pigs are being produced, respectively.

Typically, genetic progress of a line takes place in the pure line population at the genetic nucleus. The GN animals will have relatives at lower levels of the pyramid, pure bred as well as crossbred. Trait data collected from these relatives contribute to the estimation of the genetic merit of GN animals. Within a line at the GN, once selected, parents that produce the next generation are in general randomly mated with one another, while avoiding matings between closely related individuals, with the goal of increasing the genetic merit of the next generation while minimizing inbreeding. An increase in the genetic merit of the next generation constitutes genetic progress. An increase in genetic merit, in this context, means that for a given trait or set of traits, the individuals in the successive generation will express the desired trait or set of traits more strongly than their parents. With respect to undesirable traits, an increase in genetic merit means the individuals in the successive generation will express the trait or set of traits less strongly than their parents.

Genetic change, including desirable genetic change (i.e., genetic progress per year), ("dG") can be measured as the difference between the average genetic level of all progeny born in one year and all progeny born the following year. The difference is the result of selected parents having higher genetic merit than the average genetic merit of all the selection candidates (the animals available for selection). In ideal conditions, this depends upon the heritability ($h^2$) of the trait and the difference between the average performance of selected parents and that of selection candidates. The heritability of a trait ($h^2$) is the proportion of observable differences (phenotypic variance, $\sigma^2 P$) in a trait between individuals within a population that is due to additive genetic (A), as opposed to environmental (E), differences ($h^2 = \sigma^2 A/\sigma^2 P = \sigma^2 A/(\sigma^2 A + \sigma^2 E)$). The difference between the average performance of selected parents and that of all selection candidates (of which the selected parents are a subset) is also known as the selection differential.

The genetic progress per year is the result of genetic superiority of selected males and of selected females. This is expressed in the following equation:

$$dG = \{(R_{IH} * i)_{males} + (R_{IH} * i)_{females}\} * \sigma H/(L_{males} + L_{females}),$$

Where, R=the accuracy of selection, i=the selection intensity, σH=genetic variation and L=generation interval, for male or female parents.

H=breeding goal that combines genetic merit (g) of the traits (1 to m) that need to be produced weighted by the economic values (v) of the traits ($H = v_1 g_1 + v_2 g_2 + \ldots + v_m g_m$). The economic value is positive if selection is for larger phenotypic values and negative if selection is for smaller phenotypic values.

I=an index (i.e., a selection index) that combines all the trait information on the individual and its relatives and is the best estimate of the value of H for the individual.

Given the fact that MHD can take a substantial toll on productivity within the production pyramid for commercial swine, there is need to identify genetic markers for MHD so that its incidence may be reduced or eliminated from swine populations through selective breeding.

SUMMARY OF THE INVENTION

One embodiment of the invention comprises a method of reducing the incidence of heart disease in a population comprising identifying selection candidates in the population; for each selection candidate, determining an allele for a single nucleotide polymorphism corresponding to position 204959669 of chromosome 13 of Sus scrofa, or ii) one or more genetic marker in linkage disequilibrium with the single nucleotide polymorphism; selecting parents from among the selection candidates based on the determined allele or one or more genetic marker; and producing progeny from the parents. In a specific embodiment, the heart disease comprises Mulberry Heart Disease.

Another embodiment of the invention comprises a method of screening a swine for heart disease comprising obtaining a nucleic acid sample from the swine; detecting in the nucleic acid sample an allele for a single nucleotide polymorphism corresponding to position 204959669 of chromosome 13 of *Sus scrofa* or a genetic marker in linkage disequilibrium with the single nucleotide polymorphism. In a specific embodiment, the heart disease comprises Mulberry Heart Disease.

A further embodiment of the invention comprises a method of selecting a variation in a genomic nucleotide sequence that results in a desirable phenotype in a mammal comprising: obtaining a nucleic acid sample from one or a plurality of animals, embryos or mammalian cells; and detecting in the nucleic acid sample at least one of i) one or more genetic variation in the nucleotide sequence and ii) one or more genetic marker in linkage disequilibrium with one or more genetic variation in the nucleotide sequence, and therefrom selecting the variation in the nucleotide sequence that results in the desirable phenotype, wherein the desirable phenotype in the animal comprises the absence of Mulberry Heart Disease. In a more specific embodiment, the genetic variation in the nucleotide is comprised of a variation at a nucleotide position corresponding position 204959669 of chromosome 13 of *Sus scrofa*. An even more specific embodiment further comprises the step of selecting the animal, embryo or cell in the step of obtaining based on its being more likely than not to have or result in the desirable phenotype, or rejecting the animal, embryo or cell based on its not being more likely than not to have or result in the desirable phenotype said method comprising at least one of (c) selecting the animal, embryo, or cell from which the nucleic acid sample has been obtained, which animal, embryo, or cell has been determined to carry said at least one of (i) one or more genetic variation in the nucleotide sequence, and (ii) one or more genetic marker in linkage disequilibrium with one or more genetic variation in the nucleotide sequence, wherein said genetic variation in the nucleotide sequence results in a desirable phenotype in a mammal comprising the absence of Mulberry Heart Disease, and thereby selecting the animal, embryo, or cell that is more likely than not to have or result in the desirable phenotype; and (d) rejecting the animal, embryo, or cell from which the nucleic acid sample has been obtained, which animal, embryo, or cell has been determined not to carry said at least one of (i) one or more genetic variation in the nucleotide sequence, and (ii) one or more genetic marker in linkage disequilibrium with one or more genetic variation in the nucleotide sequence, wherein said genetic variation in the nucleotide sequence results in a desirable phenotype in a mammal comprising the absence of Mulberry Heart Disease, and thereby rejecting the animal, embryo, or cell that is not more likely than not to have or result in the desirable phenotype. A particular embodiment comprises the step of calculating a selection index for the animal from which the nucleic acid sample has been obtained, based on one of (i) said one or more genetic variation in the nucleotide sequence, or (ii) said one or more genetic marker in linkage disequilibrium with one or more genetic variation in the nucleotide sequence as detected in step (b). An even more specific embodiment further comprises the step of breeding animals having the desirable phenotype, said method comprising (c) selecting as a first animal, the animal from which the nucleic acid sample has been obtained, which first animal has been determined to carry said at least one of (i) one or more genetic variation in the nucleotide sequence, and (ii) one or more genetic marker in linkage disequilibrium with one or more genetic variation in the nucleotide sequence; and (d) mating the first animal of (c) to a second animal, wherein the second animal is selected from (i) a randomly selected second animal, and (ii) a second animal which has been determined to carry at least one of (i) one or more genetic variation in the nucleotide sequence, and (ii) one or more genetic marker in linkage disequilibrium with one or more genetic variation in the nucleotide sequence, and thereby breeding animals having the desirable phenotype. A specific embodiment further comprises the step of breeding an animal having the desirable phenotype, said method comprising (c) selecting the embryo from which the nucleic acid sample has been obtained, which embryo has been determined to carry said at least one of (i) one or more genetic variation in the nucleotide sequence, and (ii) one or more genetic marker in linkage disequilibrium with one or more genetic variation in the nucleotide sequence; and (d) transferring the embryo to a gestational carrier, and thereby breeding an animal having the desirable phenotype. A different embodiment further comprises the step of cloning an animal having the desirable phenotype, said method comprising (c) selecting the embryo from which the nucleic acid sample has been obtained, which embryo has been determined to carry said at least one of (i) one or more genetic variation in the nucleotide sequence, and (ii) one or more genetic marker in linkage disequilibrium with one or more genetic variation in the nucleotide sequence, to obtain a selected embryo; and (d) splitting by an embryo splitting technique the selected embryo of (c) to obtain a part of an embryo that is capable of being transferred to a gestational carrier, and thereby cloning an animal having the desirable phenotype. Another embodiment further comprises the steps of (c) selecting the plurality of animals from which the nucleic acid sample has been obtained, which animals have been determined to carry said at least one of (i) one or more genetic variation in the nucleotide sequence, and (ii) one or more genetic marker in linkage disequilibrium with one or more genetic variation in the nucleotide sequence, thereby to obtain selected animals; (d) rejecting the plurality of animals from which the nucleic acid sample has been obtained, which animals have been determined not to carry said at least one of (i) one or more genetic variation in the nucleotide sequence, and (ii) one or more genetic marker in linkage disequilibrium with one or more genetic variation in the nucleotide sequence, thereby to obtain rejected animals; and (e) forming a herd of the selected animals of (c) and excluding from the herd the rejected animals of (d), thereby to form a herd of animals more likely than not to have the desirable phenotype.

Another embodiment of the invention comprises a method of selecting a variation in a genomic nucleotide sequence between positions 0 Mb to 5 Mb of chromosome 12 or between positions 20 Mb to 210 Mb of chromosome 13 of *Sus scrofa* that results in a desirable phenotype in a mammal comprising: a) obtaining a nucleic acid sample from one or a plurality of animals, embryos or mammalian cells; and b) detecting in the nucleic acid sample at least one of i) a genetic variation in the nucleotide sequence between positions 0 Mb to 5 Mb of chromosome 12 or between positions 20 Mb to 210 Mb of chromosome 13 of *Sus scrofa* and ii) a genetic marker in linkage disequilibrium with a genetic variation in the nucleotide sequence between positions 0 Mb to 5 Mb of chromosome 12 or between positions 20 Mb to 210 Mb of chromosome 13 of *Sus scrofa*, and therefrom selecting the variation in the nucleotide sequence between positions 0 Mb to 5 Mb of chromosome 12 or between positions 20 Mb to 210 Mb of chromosome 13 of *Sus scrofa* that results in the desirable phenotype, wherein the desirable phenotype in the animal comprises the absence of Mulberry Heart Disease. In a further embodiment, the genetic variation in the nucleotide sequence is comprised of a variation at a nucleotide position corresponding position 204959669 of chromosome 13 of *Sus scrofa*. In a more specific embodiment, the step of selecting the animal, embryo or cell in the step of obtaining based on its being more likely than not to have or result in the desirable phenotype, or rejecting the animal, embryo or cell based on its not being more likely than not to have or result in the desirable phenotype said method comprising at least one of: (c) selecting the animal, embryo, or cell from which the nucleic acid sample has been obtained, which animal, embryo, or cell has been determined to carry said at least one of (i) a variation in the nucleotide sequence between positions 0 Mb to 5 Mb of chromosome 12 or between positions 20 Mb to 210 Mb of chromosome 13 of *Sus scrofa*, and (ii) a genetic marker in linkage disequilibrium a genetic variation in the nucleotide sequence between positions 0 Mb to 5 Mb of chromosome 12 or between positions 20 Mb to 210 Mb of chromosome 13 of *Sus scrofa*, wherein said genetic variation in the nucleotide sequence results in a desirable phenotype in a mammal comprising the absence of Mulberry Heart Disease, and thereby selecting the animal, embryo, or cell that is more likely than not to have or result in the desirable phenotype; and (d) rejecting the animal, embryo, or cell from which the nucleic acid sample has been obtained, which animal, embryo, or cell has been determined not to carry said at least one of (i) a genetic variation in the nucleotide sequence between positions 0 Mb to 5 Mb of chromosome 12 or between positions 20 Mb to 210 Mb of chromosome 13 of *Sus scrofa*, and (ii) a genetic marker in linkage disequilibrium with a genetic variation in the nucleotide sequence between positions 0 Mb to 5 Mb of chromosome 12 or between positions 20 Mb to 210 Mb of chromosome 13 of *Sus scrofa*, wherein said genetic variation in the nucleotide sequence results in a desirable phenotype in a mammal comprising the absence of Mulberry Heart Disease, and thereby rejecting the animal, embryo, or cell that is not more likely than not to have or result in the desirable phenotype. A further embodiment comprises the additional step of calculating a selection index for the animal from which the nucleic acid sample has been obtained, based on one of (i) said one or more genetic variation in the nucleotide sequence between positions 0 Mb to 5 Mb of chromosome 12 or between positions 20 Mb to 210 Mb of chromosome 13 of *Sus scrofa*, or (ii) said one or more genetic marker in linkage disequilibrium with one or more genetic variation in the nucleotide sequence between positions 0 Mb to 5 Mb of chromosome 12 or between positions 20 Mb to 210 Mb of chromosome 13 of *Sus scrofa* as detected in step (b). A more specific embodiment further comprises the step of breeding animals having the desirable phenotype, said method comprising: (c) selecting as a first animal the animal from which the nucleic acid sample has been obtained, which first animal has been determined to carry said at least one of (i) a genetic variation in the nucleotide sequence between positions 0 Mb to 5 Mb of chromosome 12 or between positions 20 Mb to 210 Mb of chromosome 13 of *Sus scrofa*, and (ii) a genetic marker in linkage disequilibrium with a genetic variation in the nucleotide sequence between positions 0 Mb to 5 Mb of chromosome 12 or between positions 200 Mb to 210 Mb of chromosome 13 of *Sus scrofa*; and (d) mating the first animal of (c) to a second animal, wherein the second animal is selected from: (i) a randomly selected second animal, and (ii) a second animal which has been determined to carry at least one of (i) a genetic variation in the nucleotide sequence between positions 0 Mb to 5 Mb of chromosome 12 or between positions 20 Mb to 210 Mb of chromosome 13 of *Sus scrofa*, and (ii) a genetic marker in linkage disequilibrium with a genetic variation in the nucleotide sequence between positions 0 Mb to 5 Mb of chromosome 12 or between positions 20 Mb to 210 Mb of chromosome 13 of *Sus scrofa*, and thereby breeding animals having the desirable phenotype. A more particular embodiment further comprises the step of mating an animal having the desirable phenotype, said method comprising: (c) selecting the embryo from which the nucleic acid sample has been obtained, which embryo has been determined to carry said at least one of (i) a genetic variation in the nucleotide sequence between positions 0 Mb to 5 Mb of chromosome 12 or between positions 20 Mb to 210 Mb of chromosome 13 of *Sus scrofa*, and (ii) a genetic marker in linkage disequilibrium with a genetic variation in the nucleotide sequence between positions 0 Mb to 5 Mb of chromosome 12 or between positions 20 Mb to 210 Mb of chromosome 13 of *Sus scrofa*; and (d) transferring the embryo to a gestational carrier, and thereby breeding an animal having the desirable phenotype. A yet further embodiment further comprises the step of cloning an animal having the desirable phenotype, said method comprising: (c) selecting the embryo from which the nucleic acid sample has been obtained, which embryo has been determined to carry said at least one of (i) a genetic variation in the nucleotide sequence between positions 0 Mb to 5 Mb of chromosome 12 or between positions 20 Mb to 210 Mb of chromosome 13 of *Sus scrofa*, and (ii) a genetic marker in linkage disequilibrium with a genetic variation in the nucleotide sequence between positions 0 Mb to 3 Mb of chromosome 12 or between positions 20 Mb to 210 Mb of chromosome 13 of *Sus scrofa*, to obtain a selected embryo; and (d) splitting by an embryo splitting technique the selected embryo of (c) to obtain a part of an embryo that is capable of being transferred to a gestational carrier, and thereby cloning an animal having the desirable phenotype. In a specific embodiment, the method further comprises the steps of: (c) selecting the plurality of animals from which the nucleic acid sample has been obtained, which animals have been determined to carry said at least one of (i) a genetic variation in the nucleotide sequence between positions 0 Mb to 5 Mb of chromosome 12 or between positions 20 Mb to 210 Mb of chromosome 13 of *Sus scrofa*, and (ii) a genetic marker in linkage disequilibrium with a genetic variation in the nucleotide sequence between positions 0 Mb to 5 Mb of chromosome 12 or between positions 20 Mb to 210 Mb of chromosome 13 of *Sus scrofa*, thereby to obtain selected animals; (d) rejecting the plurality of animals from which the nucleic acid sample has been obtained, which animals have been determined not to carry said at least one of (i) a genetic variation in the nucleotide sequence between positions 0 Mb to 5 Mb of chromosome 12 or between positions 20 Mb to 210 Mb of chromosome 13 of *Sus scrofa*, and (ii) a genetic marker in linkage disequilibrium with a genetic variation in the nucleotide sequence between positions 0 Mb to 5 Mb of chromosome 12 or between positions 20 Mb to 210 Mb of chromosome 13 of *Sus scrofa*, thereby to obtain rejected animals; and (e) forming a herd of the selected animals of (c) and excluding from the herd the rejected animals of (d), thereby to form a herd of animals more likely than not to have the desirable phenotype.

BRIEF DESCRIPTION OF THE DRAWINGS

FIGS. 3A-3F is a table showing the significance of the correlation of various markers on the chromosome in Landrace pigs with the presence of Mulberry Heart Disease FIGS. 4A-4F is a table showing the significance of the correlation of various markers on the chromosome in Yorkshire pigs with the presence of Mulberry Heart Disease.

DETAILED DESCRIPTION OF THE INVENTION

Figure 1:
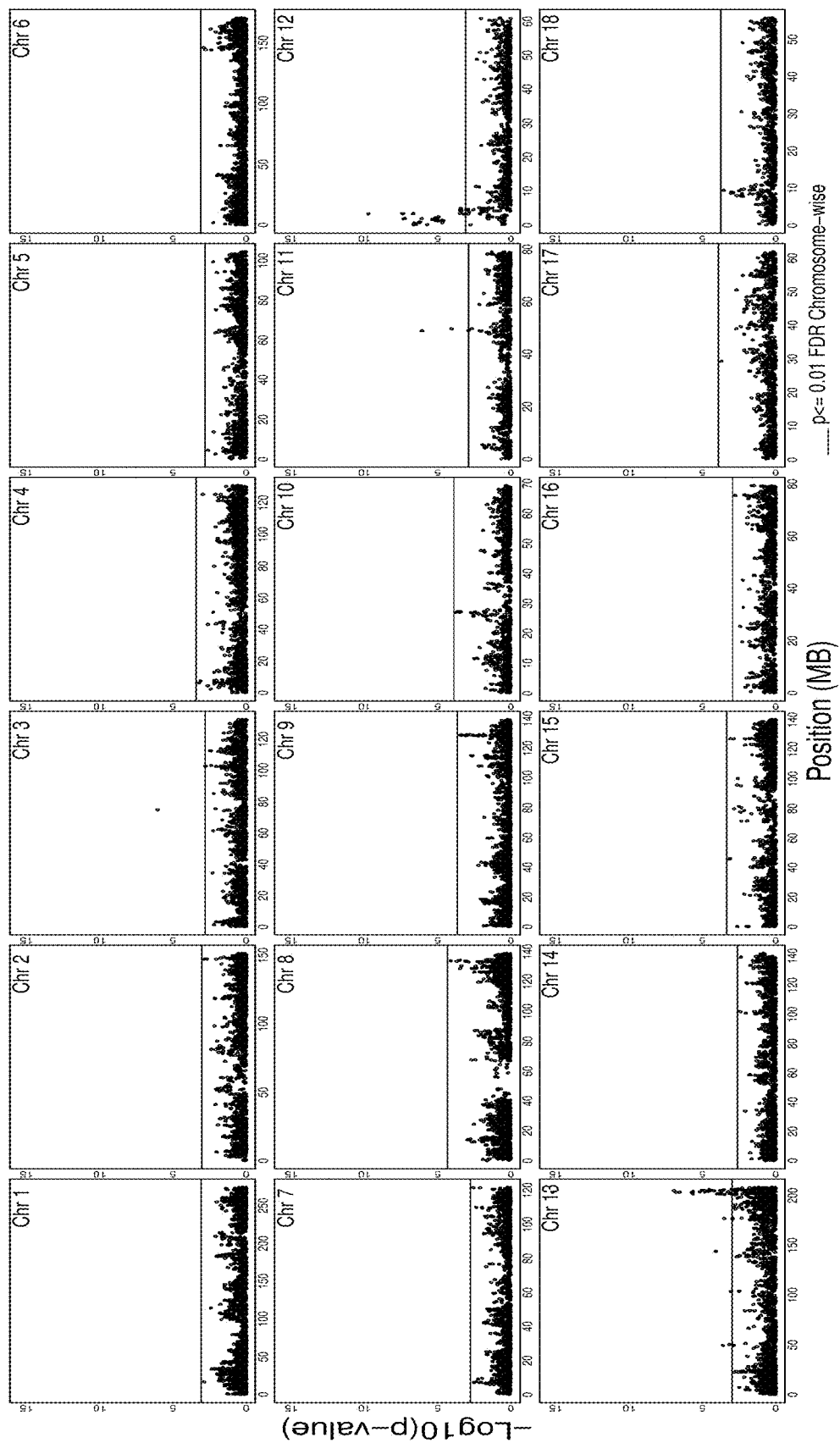
FIG. 1 is a series of graphs (each graph representing a single chromosome) showing the significance of the correlation of various markers on the chromosome in Landrace pigs with the presence of Mulberry Heart Disease.

One aspect of the invention provides methods for determining whether an animal will more likely than not be free of certain heart disease, including but not limited to hemorrhagic heart disease and MHD. As disclosed herein, all nucleotide positions of the genome for Sus scrofa are referenced from the whole-genome assembly Sscrofa11.1 (GenBank assembly accession: GCA_000003025.6; RefSeq assembly accession: GCF_000003025.6) (IDs: 1004191 [UID] 4121818 [GenBank] 4192498 [RefSeq]) available through the National Center for Biotechnology Information (ww.ncbi.nlm.nih.gov/).

In one embodiment, the invention encompasses a method of reducing the incidence of certain heart disease, which will typically present as hemorrhagic heart disease or MEM, in a population. Broadly, this is achieved by determining an allele, in an individual or a selection candidate, for a single nucleotide polymorphism (SNP) that is associated with such heart disease—specifically, a SNP corresponding to position 204959669 of chromosome 13 of Sus scrofa (reporter name: ASGA0060238). In addition to or as an alternative to determining an allele for the aforementioned SNP, one may determine an allele for one or more genetic marker in linkage disequilibrium with the aforementioned SNP. Once one or both alleles of the SNP have been determined for the individual or selection candidate, a decision can be rendered on whether to use the individual or selection candidate as a parent in the population, i.e., for contributing germplasm for the production of progeny in the population, or to subject the individual or selection candidate to additional processes such as cloning, gene editing, cell culturing and gamete collection or generation.

Another embodiment of the invention encompasses a method of selecting a variation in a genomic nucleotide sequence between positions 0 Mb to 5 Mb of chromosome 12 or between positions 20 Mb to 210 Mb of chromosome 13 of Sus scrofa that results in a phenotype in a mammal comprising the absence of hemorrhagic heart disease or MM. Broadly, such a method comprises obtaining a nucleic acid sample from one or a plurality of animals, embryos or mammalian cells; and detecting in the nucleic acid sample at least one of i) a genetic variation in the nucleotide sequence between positions 0 Mb to 5 Mb of chromosome 12 or between positions 20 Mb to 210 Mb of chromosome 13 of Sus scrofa and ii) a genetic marker in linkage disequilibrium with a genetic variation in the nucleotide sequence between positions 0 Mb to 5 Mb of chromosome 12 or between positions 20 Mb to 210 Mb of chromosome 13 of Sus scrofa, and therefrom selecting the variation in the nucleotide sequence between positions 0 Mb to 5 Mb of chromosome 12 or between positions 20 Mb to 210 Mb of chromosome 13 of Sus scrofa that results in a phenotype comprising the absence of hemorrhagic heart disease or MHD.

Within the scope of the invention, the term "single nucleotide polymorphism" or "SNP" refers to a nucleic acid sequence variation that occurs when a single nucleotide in the genome sequence is altered. Within the scope of the invention, a "single nucleotide polymorphism" may also include a nucleic acid sequence variation comprised of a single nucleotide insertion or deletion. Finally, the different nucleotides within a particular SNP may be referred to as an "allele."

For purposes of the invention, the term "parent" means an individual that contributes its germplasm for the production of progeny. For purposes of the invention, the term "individual" includes but is not limited to a portion of an individual, a non-human mammal, an animal, a selection candidate, a zygote, a morula, a blastocyst, an embryo, a fetus, a precursor stem cell, a stem cell, an embryonic stem cell, a somatic stem cell and a somatic cell. Individuals in the methods of the invention may be in vitro or in vivo individuals (e.g., in utero individuals such as fetuses) at the time a nucleic acid sample is obtained. Similarly, for purposes of the invention, the term "selection candidate" includes but is not limited to a portion of the selection candidate, a non-human mammal, an animal, a zygote, an embryo, a fetus, a precursor stem cell, a stem cell, an embryonic stem cell, a somatic stem cell and a somatic cell. For purposes of the invention, the term "population" includes but is not limited to individuals within a breed, line, genetic nucleus herd, daughter nucleus herd, or multiplier herd.

The two alleles for the SNP corresponding to position 204959669 of chromosome 13 of Sus scrofa are cytosine (C) and thymine (T). Individuals who are normal will possess a C for each allele (designated "AA"), while an individual with heart disease or that is highly likely to develop heart disease will possess a T for each allele (designated "BB"). (In other embodiments of the invention, this may be reversed, with individuals who are normal possessing a T for each allele, while an individual with heart disease or that is highly likely to develop heart disease possessing a C for each allele.) Individuals with a C and a T for the alleles of the SNP, while less likely to develop heart disease than individuals with a C for each allele, still have an elevated risk of developing heart disease compared to normal individuals (designated "AB"). Accordingly, when selecting parents from among selection candidates based on a determined allele for the SNP corresponding to position 204959669 of chromosome 13 of Sus scrofa, and with a desire to reduce the incidence of certain heart disease in the population, one may select AA or AB selection candidates as parents. If the desire is to completely eliminate the incidence of certain heart disease in the population within one generation, then one may select only AA selection candidates as parents.

Accordingly, the invention also encompasses a method of determining the risk of certain heart disease in an individual by determining in a nucleic acid sample from the individual an allele for a single nucleotide polymorphism corresponding to position 204959669 of chromosome 13 of Sus scrofa or a genetic marker in linkage disequilibrium with the single nucleotide polymorphism and then processing the individual based on the determined allele. For example, the allele for the single nucleotide polymorphism corresponding to position 204959669 of chromosome 13 of Sus scrofa may be determined to be T for an individual. This would mean that the individual would have a higher risk of developing certain heart disease, such as MEM, than compared with a normal individual who has a C for both alleles. As a result, the individual may be further processed by, for example, destroying the animal. Alternatively, if it is determined that an individual has a C for both alleles for the single nucleotide polymorphism corresponding to position 204959669 of chromosome 13 of *Sus scrofa* for example, the normal individual may be further processed by, for example, mating it with another individual or inseminating it.

For purposes of the invention, the term "processing" means physically processing, including but not limited to chemically and biologically processing and more specifically including but not limited to treating, slaughtering, euthanizing, biopsying, destroying, infusing, administering, freezing, thawing, ablating, preserving, cryopreserving, incubating, staining, vitrifying, thawing, labeling, chilling, warming, inseminating, mating, cloning, genetically modifying, gene editing, culturing and generating, or collecting, gametes from an individual or a portion of an individual. In one embodiment of the invention, gametes may be generated from an individual by for example, first generating induced pluripotent stems cells from the individual or from somatic cells from the individual, and then differentiating or deriving gametes from the induced pluripotent stem cells using known methods. In another embodiment of the invention, an AB or BB individual may be processed by administering selenium or vitamin E to the individual. Alternatively, an AB or BB individual may be slaughtered or euthanized. In another embodiment of the invention, an AA or AB individual may be processed by mating, inseminating or collecting gametes from, the individual. In yet another embodiment of the invention, an AA or AB individual may be processed by culturing the individual (e.g., a zygote or embryo) to generate a cell culture. Such a cell culture can then be additionally processed by, for example, cloning or gene editing a cell from the cell culture. In a certain embodiment, such a cell culture may be used to generate stem cells, such as induced pluripotent stem cells, using any technique known in the art. Such stem cells can also be further processed by, for example, cloning or gene editing the stem cells.

In certain embodiments of the invention, an individual may be an adult animal, for example. In this example, "culturing the individual" may entail first obtaining a cell sample from the individual and then using the cell sample to establish a cell culture. Likewise, "cloning the individual" in this example (an adult animal) may entail first obtaining a suitable cell from the individual, such as a somatic cell, and then using the somatic cell as a donor cell in somatic cell nuclear transfer to create the clone. Alternatively, "cloning the individual" in this example (an adult animal) may entail first obtaining a suitable cell from the individual, such as a somatic cell, culturing the somatic cell to generate a stem cell culture, and then using a cultured stem cell as a donor cell to create clone.

In other embodiments of the invention, an individual may be a cell, for example. In this example, "culturing the individual" may entail using the cell to establish a cell culture. Likewise, "cloning the individual" in this example (a cell) may entail using the cell as a donor cell in somatic cell nuclear transfer to create the clone. Alternatively, "cloning the individual" in this example (a cell) may entail first culturing the cell to generate a cell culture or a stem cell culture, and then using a cultured cell or a cultured stem cell as a donor cell to create a clone.

Another aspect of the invention encompasses the use of a genetic marker in linkage disequilibrium with a single nucleotide polymorphism corresponding to position 204959669 of chromosome 13 of *Sus scrofa* in any of the methods of the invention. For purposes of the invention, the term "genetic marker" refers to nucleic acids or specific genetic loci (including specific nucleotide positions) that are polymorphic or contain sequence alterations or variations within a population, including but not limited to a species, breed, line or herd. Additionally, for purposes of the invention, the term "linkage disequilibrium" refers to the tendency of the presence of an allele at one genetic locus to predict the presence of an allele at one or more other genetic loci (for example a distinct genetic marker). In certain embodiments of the invention, the genetic loci need not be on the same chromosome. However, in a particular embodiment of the invention, the genetic loci are located on the same chromosome (i.e., chromosome 13 of *Sus scrofa*). In one particular embodiment of the invention, the marker in linkage disequilibrium with a single nucleotide polymorphism corresponding to position 204959669 of chromosome 13 of *Sus scrofa* is located on chromosome 12 of *Sus scrofa*, mapping to a region between positions of approximately 0 Mb to approximately 5 Mb on chromosome 12 of *Sus scrofa*.

One measure of linkage disequilibrium that may be used with any method of the invention is DELTA$^2$, which is calculated using the formula described by Devlin et al (Genomics 29 (2):311-22 (1995)) and is a measure of how well an allele X at a first genetic locus predicts the occurrence of an allele Y at a second genetic locus. A DELTA$^2$ value of 1.0 indicates the prediction is perfect (for example, if Y is present then X is present). In particular embodiments of the invention, the linkage disequilibrium between an allele at position 204959669 of chromosome 13 of *Sus scrofa* and an allele at a second genetic locus has a DELTA$^2$ value of at least 0.75, at least 0.80, at least 0.85, at least 0.90, at least 0.95, or 1.0. While one of ordinary skill in the art will readily appreciate methods for determining whether any two alleles are in linkage disequilibrium, reference may be made to Genetic Data Analysis II, Weir, Sinauer Associates, Inc. Publishers, Sunderland, Mass., 1996.

The SNP corresponding to position 204959669 of chromosome 13 of *Sus scrofa* is found in SEQ ID NO. 1. SEQ ID NO. 1 is a nucleotide sequence comprising the 100 nucleotides on either side the SNP corresponding to position 204959669 of chromosome 13 of *Sus scrof*. Within SEQ ID NO. 1, the SNP nucleotide consists of a C nucleotide (the wildtype nucleotide) and is flanked by 100 nucleotides on either side. (The variant nucleotide at position 204959669 of chromosome 13 of *Sus scrofa*, not shown, consists of a T nucleotide.).

Detecting Genetic Variation

In certain embodiments of the invention, detecting genetic variation in a nucleic acid sample may encompass determining an allele for a SNP. It is contemplated that at least two general techniques may be utilized in the invention to determine an allele for a SNP. The first is by using nucleotide sequencing, wherein some or all of an individual's genome is sequenced. Once an individual's nucleic acid is sequenced, a SNP at a particular genetic locus within the sequence can be determined. The second technique that may be used in the invention to detect genetic variation is comprised of genotyping an individual using an oligonucleotide probe that hybridizes to a complementary nucleotide sequence in a sample, such as in a DNA microarray in which a plurality of oligonucleotide probes are typically immobilized on a substrate.

DNA Extraction

One aspect of the invention encompasses methods for extracting DNA from a biological sample and genotyping or sequencing the extracted DNA. DNA may first be extracted and then amplified (via PCR, for example) so that there is a sufficient amount of DNA for genotyping or sequencing. The invention encompasses embodiments in which the amount of DNA extracted is very low, ranging from 1 ng/µl to 10 ng/µl (based on double strand DNA assays), but also encompasses embodiments in which the amount of DNA extracted is greater than 10 ng/µl. Visualization using 1% agarose gels has shown the extracted DNA in some examples to be large, ≥23000 MW with little fragmented DNA.

For genomic analysis, approximately 1-200 ng of double stranded DNA should be extracted per sample DNA at concentration per sample of 1-50 ng/ul. In certain embodiments of the invention, only 1 ng/µl to 10 ng/µl of DNA are necessary for genomic analysis or sequencing. In a particular embodiment, less than 15 ng of DNA total is necessary for genomic analysis or sequencing.

By way of example, the following DNA extraction and amplification procedure may be used in certain embodiments of the invention. One skilled in the art will know that variations on this method exists and that this method should not be construed to limit the functionality or scope of the current invention. This method is illustrative only.

Fibroblast DNA is extracted from the contents of a 25-cm2 culture bottle by the salting-out procedure, with minor modifications (Miller et al., 1988; Biase et al., 2002). Fifty nanograms of genomic DNA is used in 25 µL of PCR mix (1 U Taq polymerase, 100 µM dNTP, 1 mM MgCl2, 5 pmol of each primer) and amplified across 36 cycles using the following conditions: 93° C. for 3 min, 93° C. for 40 s, 58° C. for 40 seconds, 72° C. for 40 seconds, and 72° C. for 5 min.

In certain embodiments of the invention, DNA from various cell types can be extracted using the Purelink Genomic Kit Cat #K1820-00 (Invitrogen). In further embodiments, once the DNA is extracted, it can be put through a whole genome amplification protocol using the Illustrate Genomiphi V2 DNA amplification kit (GE Lifesciences), which uses the phi29 DNA polymerase to amplify the genome.

In other embodiments of the invention the following DNA extraction procedure is employed.

Cells exposed to culture media often contain fetal calf serum. Due to high levels of DNase commonly found in fetal calf serum and the presence of cations that could catalyze the hydrolytic cleavage of phosphodiester linkage in DNA, an equal volume of a solution containing Tris-EDTA is added to the harvested cells to chelate cations essential for DNase activity. After adding the Tris-EDTA, the cell suspension is then stored in 1.5 ml microcentrifuge tubes at 4° C. until required for DNA extraction.

The 1.5 ml tubes containing cell suspension are spun at ≥10000×g in a microcentrifuge for 45 seconds to pellet cells. The suspension solution is pipetted off carefully so as not to remove pelleted cells. Approximately 50 µl of suspension solution is left in the tube. The tubes are then vortexed for 10 seconds to resuspend the cell pellets. 300 µl of Tissue and Cell Lysis Solution (Lucigen Corp.; Madison Wisconsin) containing 1 µl of Proteinase K (Lucigen Corp.; Madison Wisconsin) are then added to each tube and mixed. The tubes are then incubated at 65° C. for 30 minutes while making sure to vortex at 15 minutes. The samples are then cooled to 37° C. Afterwards 1 µl of 5 mg/µlRNase A (Lucigen Corp.; Madison Wisconsin) is added to each sample and then mixed. The samples are then incubated at 37° C. for 30 minutes. The samples are then placed in a 4° C. cooler for 5 minutes. 175 µl of MPC Protein Precipitation Reagent (Lucigen Corp.; Madison Wisconsin) are then added to each sample, and the samples are then vortexed vigorously for 10-15 seconds. The samples are then centrifuged in order to pellet debris for 8 minutes at ≥10000×g. The supernatant is then transferred to a clean microcentrifuge tube. 600 µl of cold (−20° C.) isopropanol is added to the supernatant. Each tube is then inverted 30-40 times. The DNA is then pelleted by centrifugation for 8 minutes in a microcentrifuge at ≥10000×g. The isopropanol is poured off without dislodging DNA pellet. The pellet is rinsed once with 70% ethanol and then the ethanol is carefully poured off so as not to disturb the DNA pellet. The residual ethanol is then removed with a pipette, and the DNA pellet is allowed to air dry in the microcentrifuge tube. Once dried, the DNA pellet is resuspended in 20 µl Tris-EDTA.

Genotyping

In one aspect of the invention, extracted and/or amplified DNA from a biological sample may be genotyped using SNP microarrays or chips, which are readily available for various species of animals from companies such as Illumina and Affymetrix. For purposes of the invention, the term "genotyping" includes, but is not limited to, obtaining SNP and/or copy number variation (CNV) data from DNA. For purposes of the invention, the term "genotype" includes, but is not limited to, SNP and/or copy number variation (CNV) data obtained from DNA. Low density and high density chips are contemplated for use with the invention, including SNP arrays comprising from 3,000 to 800,000 or more SNPs. By way of example, a "50K" SNP chip detects approximately 50,000 SNPs and is commonly used in the livestock industry to establish genetic merit or genomic estimated breeding values (GEBVs).

In addition to microarray genotyping, in certain embodiments of the invention, massarray genotyping may be implemented to generate a genotype. Massarray genotyping generally works by extending a primer adjacent to the SNP with the complementary base to each allele and then measuring the mass of the extended probe in a mass spectrometer that can differentiate between the addition of each base (A, C, G, or T). In other embodiments of the invention, PCR-RFLP genotyping may be used to generate a genotype. Generally, PCR-RFLP genotyping uses forward and reverse oligonucleotide primers that flank the SNP; a restriction enzyme that cuts only one allele is then used to digest the PCR product and the genotypes are revealed by running the digested PCR products on, for example, an agarose gel. The pattern (size) of the DNA fragments defines the genotype.

Nucleotide Sequencing

One aspect of the invention comprises nucleotide sequencing nucleic acids such as DNA. In certain embodiments of the invention, nucleic acid is extracted from a biological sample from an individual and then nucleotide sequenced using any known method known in the art, including but not limited to Sanger sequencing and high throughput sequencing, which includes next generation (short read) sequencing and third generation (long read) sequencing. In one embodiment of the invention, one read with short read sequencing typically on average comprises about 100 to 300 base pairs, and one read with long read sequencing typically on average comprises about 15,000 base pairs. Nonlimiting examples of sequencing methods for use in the invention include single-molecule real time sequencing, ion semiconductor sequencing, pyrosequencing, sequencing by synthesis, combinatorial probe anchor synthesis, sequencing by ligation, nanopore sequencing, massively parallel signature sequencing, polony sequencing, DNA nanoball sequencing, heliscope single molecule sequencing and sequencing using droplet based microfluidics or digital microfluidics.

Breeding Program

One aspect of the invention comprises identifying animals with a genetic variation that results in a phenotype comprising the absence of MHD and selecting those animals as parents of the next generation withing a breeding program.

In a specific embodiment, the invention encompasses a method of selecting a variation in a genomic nucleotide sequence between positions 0 Mb to 5 Mb of chromosome 12 or between positions 20 Mb to 210 Mb of chromosome 13 of Sus scrofa that results in a desirable phenotype in a mammal comprising obtaining a nucleic acid sample from one or a plurality of animals, embryos or mammalian cells; and detecting in the nucleic acid sample at least one of i) a genetic variation in the nucleotide sequence between positions 0 Mb to 5 Mb of chromosome 12 or between positions 20 Mb to 210 Mb of chromosome 13 of Sus scrofa and ii) a genetic marker in linkage disequilibrium with a genetic variation in the nucleotide sequence between positions 0 Mb to 5 Mb of chromosome 12 or between positions 20 Mb to 210 Mb of chromosome 13 of Sus scrofa, and therefrom selecting the variation in the nucleotide sequence between positions 0 Mb to 5 Mb of chromosome 12 or between positions 20 Mb to 210 Mb of chromosome 13 of Sus scrofa that results in the desirable phenotype, wherein the desirable phenotype in the animal comprises the absence of MHD. A further aspect of the invention may further comprise the step of breeding animals having the desirable phenotype by selecting as a first animal the animal from which the nucleic acid sample has been obtained, which first animal has been determined to carry the at least one of (i) a genetic variation in the nucleotide sequence between positions 0 Mb to 5 Mb of chromosome 12 or between positions 20 Mb to 210 Mb of chromosome 13 of Sus scrofa, and (ii) a genetic marker in linkage disequilibrium with a genetic variation in the nucleotide sequence between positions 0 Mb to 5 Mb of chromosome 12 or between positions 200 Mb to 210 Mb of chromosome 13 of Sus scrofa; and then mating the first animal to a second animal, wherein the second animal is selected from (i) a randomly selected second animal, and (ii) a second animal which has been determined to carry at least one of (i) a genetic variation in the nucleotide sequence between positions 0 Mb to 5 Mb of chromosome 12 or between positions 20 Mb to 210 Mb of chromosome 13 of Sus scrofa, and (ii) a genetic marker in linkage disequilibrium with a genetic variation in the nucleotide sequence between positions 0 Mb to 5 Mb of chromosome 12 or between positions 20 Mb to 210 Mb of chromosome 13 of Sus scrofa, and thereby breeding animals having the desirable phenotype.

Additionally, another aspect of the invention comprises generating a selection index for the purpose of selecting parents of the next generation among selection candidates in a breeding program that factors in the likelihood that a selection candidate may or may not have a genetic variation that results in MHD.

For example,

AA, AB or BB is the genotype of a given animal
AA=healthy
AB=may have MBH
BB=may also have MBH, but more often than AB A value is then ascribed to the B allele (for example, a negative value) and then a higher value (for example, less negative than the value ascribed to the B allele) is ascribed to the A allele. The values for each allele are then added together to generate a score. In this example, an animal with an AA genotype would be ranked higher on the index than an animal with an AB genotype, all else being equal. The animal with an AB genotype would in turn be ranked higher than an animal with a BB genotype, all else being equal. Parents can then be selected from among the selection candidates based on these generated scores and then mated to produce offspring.

Cloning

One aspect of the invention encompasses cloning using a selected cell of the invention as a donor or a stem cell derived from a selected cell as a donor cell. Any known method in the art for deriving stem cells, including pluripotent stem cells, from somatic cells may be used in the invention. The following cloning procedure is presented by way of nonlimiting example only.

Oocyte Enucleation. In vivo matured oocytes are collected from donor females. Oocytes with attached cumulus cells or devoid of polar bodies are discarded. Cumulus-free oocytes are divided into two groups: oocytes with only one polar body evident (metaphase II stage) and the activated telophase II protocol (oocytes with one polar body and evidence of an extruding second polar body). Oocytes in telophase II are cultured in M199+10% FBS for 3 to 4 hours. Oocytes that are activated during this period, as evidenced by a first polar body and a partially extruded second polar body, are grouped as culture induced, calcium activated telophase II oocytes (Telophase II-Ca+2) and enucleated. Oocytes that have not activated are incubated for 5 minutes in PBS containing 7% ethanol prior to enucleation. Metaphase II stage oocytes (one polar body) are enucleated with a 25-30 micron glass pipette by aspirating the first polar body and adjacent cytoplasm surrounding the polar body (approximately 30% of the cytoplasm) presumably containing metaphase plate.

Telophase stage oocytes are prepared by two procedures. Oocytes are initially incubated in phosphate buffered saline (PBS, Ca+2/Mg+2 free) supplemented with 5% FBS for 15 minutes and Cultured in M 199+10% FBS at 38° C. for approximately three hours until the telophase spindle configuration or the extrusion of the second polar body is reached. All the oocytes that respond to the sequential culture under differential extracellular calcium concentration treatment are separated and grouped as Telophase II-Ca2+. The other oocytes that do not respond are further incubated in 7% ethanol in M199+10% FBS for 5-7 minutes (Telophase II-ETOH) and cultured in M199+10% FBS for 2 to 4 hours. Oocytes are then cultured in M199+10%/FBS containing 5 µg/ml of cytochalasin-B for 10-15 minutes at 38° C. Oocytes are enucleated with a 30 micron (OD) glass pipette by aspirating the first polar body and approximately 30% of the adjacent cytoplasm containing the metaphase II or about 10% of the cytoplasm containing the telophase II spindle. After enucleation the oocytes are immediately reconstructed.

Embryo Reconstruction: Cells are harvested by trypsinizing (0.025% trypsin/0.5 mM EDTA) (Sigma) for 7 minutes. Single cells are resuspended in equilibrated M199+10% FBS supplemented with 2 mM L-glutamine, penicillin/streptomycin. The donor cell injection is carried out in the same medium as for enucleation. Donor cells are graded into small, medium and large before selection for injection to enucleated cytoplasts. Small single cells (10-15 micron) are selected with a 20-30 micron diameter glass pipette. The pipette is introduced through the same slit of the zona made during enucleation and donor cells are injected between the zone pellucida and the ooplasmic membrane. The reconstructed embryos are incubated in M199 30-60 minutes before fusion and activation.

Fusion and Activation. All reconstructed embryos (ethanol pretreatment or not) are washed in fusion buffer (0.3 M mannitol, 0.05 mM CaCl2, 0.1 mM MgSO4-, 9 mM K2HPO4, 0.1 mM glutathione, 0.1 mg/ml BSA in distilled water) for 3 minutes before electrofusion. Fusion and activation are carried out at room temperature, in a chamber with two stainless steel electrodes 200 microns apart (BTX® 200 Embryomanipulation System, BTX®-Genetronics, San Diego, Calif.) filled with fusion buffer. Reconstructed embryos are placed with a pipette in groups of 3-4 and manually aligned so the cytoplasmic membrane of the recipient oocytes and donor CFF155-92-6 cells are parallel to the electrodes. Cell fusion and activation are simultaneously induced 32-42 hours post GnRH injection with an initial alignment/holding pulse of 5-10 V AC for 7 seconds, followed by a fusion pulse of 1.4 to 1.8 KV/cm DC for 70 microseconds using an Electrocell Manipulator and Enhancer 400 (BTX®-Genetronics). Embryos are washed in fusion medium for 3 minutes, then they are transferred to M199 containing 5 μg/ml cytochalasin-B (Sigma) and 10% FBS and incubated for 1 hour. Embryos are removed from M199/cytochalasin-B medium and co-cultured in 50 microliter drops of M199 plus 10% FBS with goat oviductal epithelial cells overlaid with paraffin oil. Embryo cultures are maintained in a humidified 39° C. incubator with 5% CO2 for 48 hours before transfer of the embryos to recipient females.

The following alternative cloning procedure is presented by way of nonlimiting example only.

Remove cumulus oocyte-complexes (COC's) from maturation medium and rinse through one dish of warm TL Hepes (MOFA GLOBAL, Bovi Pro Oocyte Washing Medium with BSA at 3 mg/ml, filtered). Transfer the COC's into a hyaluronidase drop within the dish of TL Hepes. The cumulus cells of the COC's are stripped by hand, first by using a 200 μl gel loader pipet tip to remove the outer layers of cumulus, then by using a denudation pipet to remove the remaining cumulus cells. Those oocytes that are clean (no cumulus cells) are transferred to a second dish of warm TL Hepes. If there are eggs that still have cumulus cells attached, transfer those to another drop of hyaluronidase and finish hand stripping them, then transfer to the TL Hepes dish. The maturation rate (MO, mature oocyte) is determined by checking each viable oocyte for an extruded polar body (PB). Those eggs that are not mature need to be enucleated immediately.

To a nunc well, add 0.50 ml of Cyto B medium (2 ml TL Hepes and 1 μl Cytochalasin B (Sigma C-6762)) and 10 μl of Hoescht stain. Remove the oocytes from the maturation medium and rinse through warm TL Hepes, and then place the oocytes in the nunc well with the Hoescht stain for 15 minutes. At the end of the 15 minutes, rinse the oocytes through warm Cytochalasin B. Transfer to the lower drop of Cytochalasin B in a manipulation plate. Using the tip of a glass enuclation tip (25 μm inner diameter), pierce through the zona of an oocyte, carefully, bring your tip near to the chromosomes and slowly aspirate them out, taking as little cytoplasm as possible. When that oocyte is successfully enucleated move to a separate area of the dish and enucleate the rest of the oocytes. When you are ready to "reconstruct" (putting a cell into the enucleated oocyte), turn the UV light off, turn up the light to a comfortable level. Get an enucleated oocyte on the holder, using your tip, turn the oocyte until the "slit" made when enucleating the oocyte is in focus and in the same plane as your tip. Using the slit deposit one cell into the space between the zona and the cytoplasmic membrane of the oocyte to create a reconstructed embryo.

Rinse all reconstructed embryos in TL Hepes and then place into a maturation caffeine media (2 ml in vitro maturation media with 3.9 mg caffeine) until ready to fuse, at approximately 24 hours post maturation.

When ready to fuse (approximately at 23.5-24 hours post maturation), turn on the BTX machine (ECM Square Wave Electroporation System 830), making sure the settings are: mode LV, voltage 100, pulse length 40 μsec. Put the fusion chamber into the 100 mm dish, attach the red lead to the top wire, the black lead to the lower wire. Transfer reconstructed embryos in a dish comprising TL Hepes. Pick up 8-10 reconstructed embryos and transfer to a dish containing a caffeine media (29.1 mg of caffeine in 15 ml of TL Hepes) and let them sink. Transfer the 8-10 reconstructed embryos to another dish containing 2 ml of a SOR-based media (77.7 mg caffeine in 50 ml of SOR media) and let the sink. Finally, transfer the 8-10 reconstructed embryos to the fusion chamber, which is filled with the SOR-based media, and once the reconstructed embryos are lined up, hit "pulse" on BTX machine. Once fused, transfer reconstructed embryos back to the dish containing the caffeine media for rinsing and then to a dish containing TL Hepes, until all reconstructed embryos are fused. When fusions are completed, transfer all fused embryos to a dish containing 500 μl of a CR1aa/CR2 media (comprising 9.7 mg caffeine/5 ml CR2) for 1 hour.

To activate, (at 25 hours, 1 hour post-CR2+caffeine), place reconstructed embryos in a nunc well along with 500 μl of ionomycin media (3 μl ionomycin and 3 ml TL Hepes) for 4 minutes. Remove and rinse three times in a dish of warm TL Hepes. Transfer the activated embryos to a nunc well containing 500 μl of cycloheximide media (at a concentration of 10 μg/ml of cycloheximide) and return to the incubator for 5 hours. After the 5 hours, remove the lysed oocytes, and rinse the remaining oocytes 6 times through the center area of the nunc well and return to the incubator. This is Day 0. On Day 5, move all embryos that are less than 8 cells to another nunc well, (count the number of 1 cells, cleaved, 8 cells and morula), leave the 8 cells and morula, add 25 μl of warm fetal bovine serum (FBS 5%) to the well and return to the incubator. On Day 6 and Day 7, check for any embryos that can be transferred. If there are, using a 2 ml Sartstedt tube, put 1 ml of Minitube holding media (BoviHold, Minitub International) into the tube and warm. Once the media is warm, transfer embryos to the tube and send to the farm for embryo transfer.

Genetic Modification

One aspect of the invention encompasses methods of genetically modifying selected cells of the invention or cells derived from selected cells, such as stem cells including pluripotent stem cells. In particular, one aspect of the invention encompasses correcting or suppressing one or more mutations or variations responsible for a phenotype comprising hemorrhagic heart disease or MHD and then 1) using the cell as a donor to create a clone or 2) using the cell to derive/generate gametes and then producing progeny from the gametes. In a particular embodiment, gene editing can be used to make targeted changes to gene sequences that remain after cell division. Clustered regularly interspaced palindromic repeats (CRISPR) and CRISPR associated endonuclease (Cas9) may be used to repair a mutated gene by providing a DNA template of the normal gene that can be incorporated through a process known as homology directed repair (HDR). Supharattanasitthi et al. demonstrated CRISPR/Cas9-mediated one step bi-alelic change of genomic DNA in induced pluripotent stem cells in vitro using dual antibiotic selection (Scientific Reports (2019) 9:174). One aspect of the invention comprises producing pluripotent stem cells from a selected embryo or a selected cell by any known method in the art. In a further embodiment, the method outlined in Supharattanasitthi et al. can be used to alter the genomic DNA of stem cells to correct or eliminate the possibility of an undesirable phenotype comprising hemorrhagic heart disease or MHD.

Example 1

Example 1 is comprised of a genome-wide association analysis using DNA pools for MHD in swine.
Sample Preparation and Pooling In total 205 samples from crossbred pigs were received, which was classified into three groups: Mulberry Heart disorder (MBH), Sudden Death (SD) without Mulberry heart clinical symptoms and controls (C). Genomic DNA was extracted, and the samples failed extraction were repeated. DNA quantification was measured three times for each sample; the average concentration of two reads with smallest absolute difference was used to calculate the sample volume for pooling (samples in the same pool were mixed in equal DNA quantity). 111 MBH, 29 SD and 59 C samples with sufficient DNA yield were used to construct DNA pools. Each pool was replicated 3 times. 24 pooled DNA samples were genotyped on the Porcine80K BeadChip.

Individual genotyping: a total of 456 samples from Duroc pigs were genotyped for the Porcine80K BeadChip. All the animals presented a call rate higher than 95%. Only autosomal SNPs were analyzed and quality control procedures excluded SNPs without known position, with a call rate <90%, that were not polymorphic, and without a heterozygous call.

Pooling allele frequencies: Pooling allele frequency was adjusted for average intensity differences obtained on individual genotyped data, i.e., frequencies from pools were corrected by using the mean of the ratios A.raw/B.raw (k) obtained from true heterozygotes. The frequency of allele a (f (A)) in the pools was then calculated as described by Hoogendorn, et al. (2000), in which: A.raw is the absorbency of the primer extension products for allele A, B.raw is the absorbency of the primer extension products for allele B, k=ratio A.raw/B.raw observed on true heterozygotes.

The frequency of each group (Control, Sudden Death, and Mulberry Heart) was defined as the average between pools and replicates in each group. A total of 11, 9, and 24 SNPs were excluded from, respectively, Control, Sudden Death and Mulberry Heart groups, because they failed on genotype procedures in one or more replication.
Genome-Wide Association Analysis Only SNPs that passed on individual genotype quality control and that had calls for all the replicates within group were considered in the association analysis. Analyses including a filter of 0.05 for minor allele frequency (MAF), were also performed. Results were similar to the analysis without a filter for MAF.

A test, T, for differences between two proportions (Moskovina et al., 2005, Craig, et al., 2005; and Macgregor et al., 2006) was used to evaluate the significance of the allele frequencies difference between case and control groups. The test statistic T is equivalent to the t test applied for the difference between two means and has a distribution with approximately one degree of freedom under the null hypothesis of equal allele frequencies for cases and controls (Moskovina et al., 2005).
Results After individual and pooling genotype quality control, a total of 54319, 54304, and 54305 autosomal SNPs were tested for CxMBH, CxSD, and SDxMBH, respectively..

Results of this first analysis were followed by a second study to validate the results. The second study was performed on purebred animals that were unrelated to the original dataset. At this time, a mixed linear model based association analysis was performed for Landrace (LA) and Yorkshire (YO) breeds separately. We used package GCTA and the model was:

$$y = a + bx + g + e$$

Where y is the phenotype, a is the mean term, b is the additive effect (fixed effect) of the candidate SNP to be tested for association, x is the SNP genotype indicator variable coded as 0, 1 or 2, g is the polygenic effect (random effect), i.e., the accumulated effect of all SNPs (as captured by the GRM calculated using all SNPs) and e is the residual. For the ease of computation, the genetic variance, var(g), was estimated based on the null model, i.e., $y = a + g + e$ and then fixed while testing for the association between each SNP and the trait. The contemporary group and sex was also included in the model as a fixed effect.

The dataset was comprised of animals born between 2015 to 2017. The Mulberry Heart diagnosis was performed by a trained technician. A total of 15,144 and 23,338 were included on LA and YO analysis, in which 69 and 75 and had Mulberry Heart in each breed respectively. The average of affected animals per year was 41 for LA and 60 for YO. Animals that died but could not have the MHD diagnostic confirmed were excluded from the analysis. All animals had individual genotypes for 43,924 SNPs. Quality control for minor allele frequency and call rate was performed.

Figure 2:
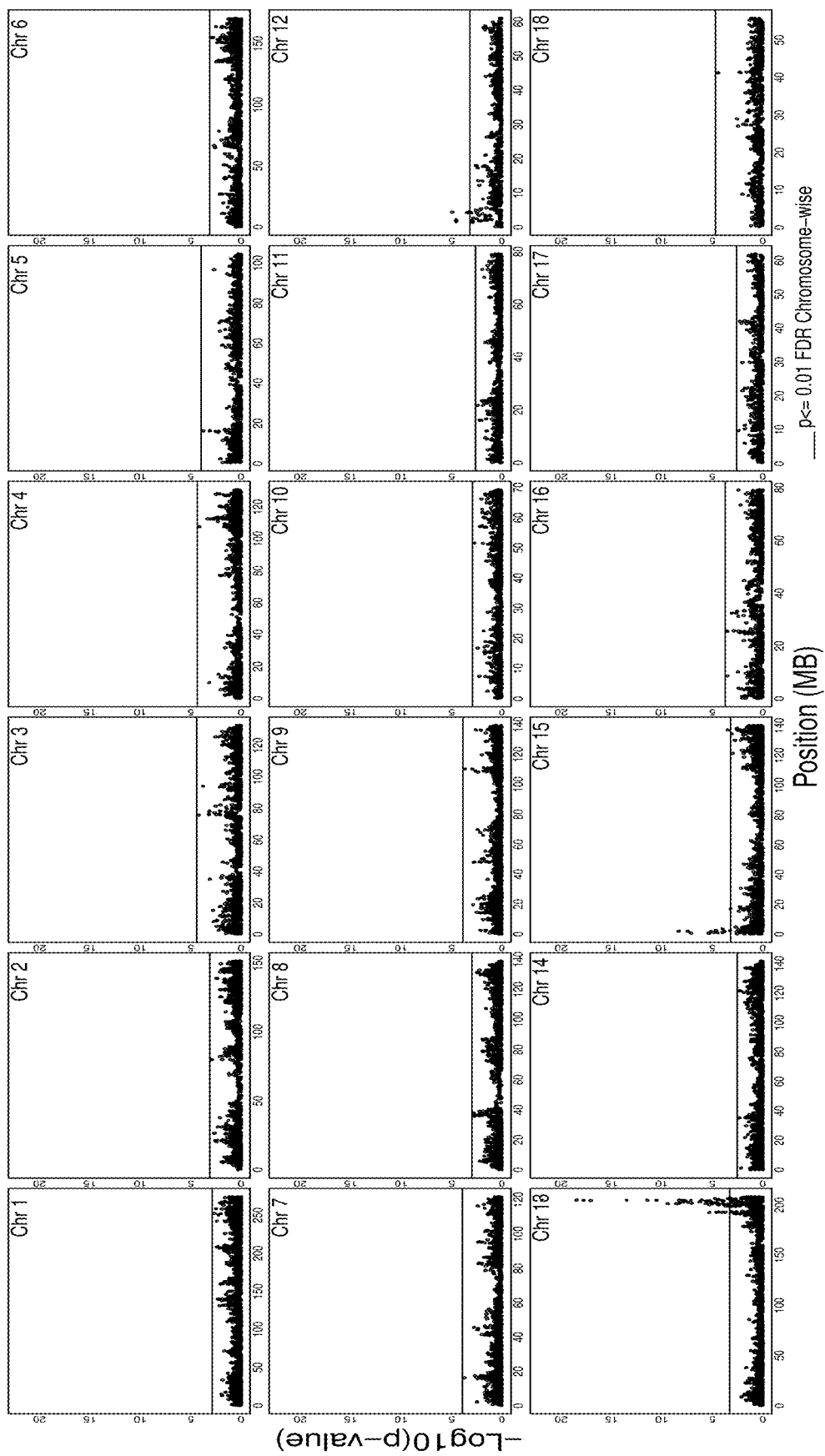
FIG. 2 is a series of graphs (each graph representing a single chromosome) showing the significance of the correlation of various markers on the chromosome in Yorkshire pigs with the presence of Mulberry Heart Disease.

The results from the second set of analyses are presented in FIGS. 1-4. FIG. 1 shows the chromosomes containing significant SNPs for MHD in Landrace pigs, and FIG. 2 shows the chromosomes containing significant SNPs for MHD in Yorkshire pigs. In light of these results, it can be observed that the significant SNPs for MHD were concentrated in two regions—on chromosome 12 (between approximately 0 Mb and 5 Mb) and on chromosome 13 (between approximately 20 Mb and 210 Mb). FIGS. 3 and 4, comprise a list of the significant SNPs for MEM in Landrace and Yorkshire pigs, respectively (99% and 95% confidence interval—"c_FDR" 1% and 5%, respectively).

I claim:

1. A method of reducing the incidence of Mulberry heart disease in a Sus scrofa population comprising:
    identifying selection candidates in the population;
    for each selection candidate, determining i) an allele of a single nucleotide polymorphism corresponding to position 204959669 of chromosome 13 of *Sus scrofa*, or ii) an allele of a genetic marker in linkage disequilibrium with the single nucleotide polymorphism wherein the allele of the genetic marker in linkage disequilibrium with the single nucleotide polymorphism is perfectly predictive of an allele of the single nucleotide polymorphism;
    selecting parents from among the selection candidates based on the determined allele of the single nucleotide polymorphism or based on the determined allele of the genetic marker in linkage disequilibrium with the single nucleotide polymorphism in the population; and
    producing progeny from the parents.

2. The method of claim 1, further comprising the step of correlating the determined allele of the single nucleotide polymorphism or the determined allele of the genetic marker with the risk of Mulberry heart disease in the individual.

* * * * *

SEQUENCE LISTING

<160> NUMBER OF SEQ ID NOS: 1

<210> SEQ ID NO 1
<211> LENGTH: 201
<212> TYPE: DNA
<213> ORGANISM: Sus scrofa

<400> SEQUENCE: 1

-continued

```
cttccacaga agcctaatga cctttgccca agtgcctcat ttgaattcat tttcaagggc        60
gtttcgtgga gtattcagtg cttacagctt cttgccctga catagaggag cccaggaagg       120
gcaagatagc atccctgctc tggaacctaa aatctgtctc agagaccctt cttggaacag       180
gaattgcaaa cagaaatgcc a                                                 201
```